US012186664B2

(12) United States Patent
Zeng et al.

(10) Patent No.: US 12,186,664 B2
(45) Date of Patent: Jan. 7, 2025

(54) VIRTUAL CHARACTER SELECTION METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventors: Peiyuan Zeng, Shenzhen (CN); Peicheng Liu, Shenzhen (CN); Jinwei Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 375 days.

(21) Appl. No.: 17/751,501

(22) Filed: May 23, 2022

(65) Prior Publication Data

US 2022/0314118 A1    Oct. 6, 2022

Related U.S. Application Data

(63) Continuation of application No. PCT/CN2021/125082, filed on Oct. 20, 2021.

(30) Foreign Application Priority Data

Mar. 30, 2021   (CN) .......................... 202110342128.6

(51) Int. Cl.
*A63F 13/55* (2014.01)
*A63F 13/79* (2014.01)
(Continued)

(52) U.S. Cl.
CPC .............. *A63F 13/55* (2014.09); *A63F 13/79* (2014.09); *A63F 13/822* (2014.09); *A63F 13/92* (2014.09)

(58) Field of Classification Search
CPC ........ A63F 13/55; A63F 13/79; A63F 13/822; A63F 13/92
See application file for complete search history.

(56) References Cited

U.S. PATENT DOCUMENTS 8,376,834 B2 *   2/2013   Hirzel .................. A63F 13/798
                                                              463/23
9,687,745 B2 *   6/2017   Lin ........................ A63F 13/795
(Continued)

FOREIGN PATENT DOCUMENTS

CN              1577372 A       2/2005
CN            105148517 A      12/2015
(Continued)

OTHER PUBLICATIONS

League of Legends Operation Team , "Ranking Must-see: Pre-selection Ranking Mode Graphical Tutorial", Mar. 16, 2016, 6 pgs., Retrieved from the Internet: https://lol.qq.com/webplat/info/news_version3/152/4579/4581/m3106/201601/425430.shtml.

(Continued)

*Primary Examiner* — Chase E Leichliter
(74) *Attorney, Agent, or Firm* — Morgan, Lewis & Bockius LLP

(57) ABSTRACT

An electronic device sets first position preference information of a first user account in response to receiving a preference setting operation. The device displays a first current team position corresponding to the first user account in response to receiving a game matching operation. The first current team position is a position played by the first user account in the current online game and is assigned based on the first position preference information. The electronic device displays a plurality of candidate virtual characters based on the first current team position. In response to receiving a selection operation performed on a target virtual character in the plurality of candidate virtual (Continued)

characters, the electronic device designates the target virtual character as a master character of the first user account in the current online game.

20 Claims, 17 Drawing Sheets

(51) Int. Cl.
*A63F 13/822* (2014.01)
*A63F 13/92* (2014.01)

(56) References Cited

U.S. PATENT DOCUMENTS

| | | | |
|---|---|---|---|
| 10,967,269 B2* | 4/2021 | Onishi | A63F 13/69 |
| 11,484,801 B2* | 11/2022 | Tripathi | A63F 13/35 |
| 2009/0098940 A1 | 4/2009 | Sangberg | |
| 2011/0275431 A1* | 11/2011 | Hirzel | A63F 13/822 |
| | | | 463/23 |
| 2012/0172098 A1* | 7/2012 | Baker | G07F 17/3237 |
| | | | 463/43 |
| 2013/0244784 A1* | 9/2013 | Assa | G06F 3/0416 |
| | | | 463/40 |
| 2014/0330734 A1 | 11/2014 | Sung et al. | |
| 2014/0364194 A1* | 12/2014 | Kusano | A63F 13/35 |
| | | | 463/22 |
| 2015/0057084 A1* | 2/2015 | Lin | A63F 13/352 |
| | | | 463/42 |
| 2017/0144072 A1 | 5/2017 | Onishi et al. | |
| 2018/0169525 A1* | 6/2018 | Onishi | A63F 13/537 |
| 2020/0061468 A1* | 2/2020 | Zhang | A63F 13/92 |
| 2020/0245019 A1* | 7/2020 | Yin | A63F 13/45 |
| 2020/0391111 A1 | 12/2020 | Yu et al. | |
| 2021/0038996 A1* | 2/2021 | Lin | A63F 13/795 |
| 2021/0331076 A1* | 10/2021 | Labate | A63F 13/48 |
| 2022/0072431 A1* | 3/2022 | Lin | A63F 13/85 |
| 2022/0305390 A1* | 9/2022 | Tripathi | A63F 13/795 |
| 2022/0314118 A1* | 10/2022 | Zeng | A63F 13/822 |
| 2022/0379215 A1* | 12/2022 | Zeng | A63F 13/35 |

FOREIGN PATENT DOCUMENTS

| | | |
|---|---|---|
| CN | 106488789 A | 3/2017 |
| CN | 112245908 A | 1/2021 |
| CN | 112891931 A | 6/2021 |
| JP | 2005034303 A | 2/2005 |
| JP | 2016019572 A | 2/2016 |
| TW | 201043302 A | 12/2010 |

OTHER PUBLICATIONS

Blizzard Entertainment, "New Roll Cue", Jul. 18, 2019, 8 pgs., Retrieved from the Internet: https://overwatch.blizzard.com/ja-jp/news/23060961/.

Ed Knapp, "/DEV: Choose Your Position", Riot Games, Mar. 27, 2021, 5 pgs., Retrieved from the Internet: https://wildrift.leagueoflegends.com/ja-jp/news/dev/dev-picking-your-position/.

Shinichi Sekine, "Starting from scratch—League of Legends—Episode 8: Practice is over. Let's finally have a bettle we can't afford to lose!", Jul. 5, 2016, 9 pgs., Retrieved from the Internet: https://game.watch.impress.co.jp/docs/series/lol/1006794.html.

Tencent Technology, WO, PCT/CN2021/125082, Jan. 19, 2022, 6 pgs.

Tencent Technology, IPRP, PCT/CN2021/125082, Oct. 3, 2023, 7 pgs.

Tencent Technology, Korean Office Action, KR Patent Application No. 10-2022-7027492, Jul. 10, 2024, 21 pgs.

Tencent Technology, ISR, PCT/CN2021/125082, Jan. 19, 2022, 2 pgs.

* cited by examiner

VIRTUAL CHARACTER SELECTION METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2021/125082, entitled "VIRTUAL CHARACTER SELECTION METHODS, DEVICES, STORAGE MEDIA AND PROGRAM PRODUCTS" filed on Oct. 20, 2021, which claims priority to Chinese Patent Application No. 202110342128.6, filed with the State Intellectual Property Office of the People's Republic of China on Mar. 30, 2021, and entitled "VIRTUAL CHARACTER SELECTION METHOD AND APPARATUS, DEVICE, STORAGE MEDIUM", all of which are incorporated herein by reference in their entirety.

FIELD OF THE TECHNOLOGY

This application relates to the field of human-computer interaction technologies, and in particular, to a virtual character selection method and apparatus, a device, a storage medium, and a program product.

BACKGROUND OF THE DISCLOSURE

In multiplayer online battle arena (MOBA), ten users are divided on average into two teams to compete against each other in a virtual environment. Different users in the same team may use characters having different team positions according to team task distribution. For example, a character type of "support" is responsible for providing gains for other characters in the same team, and a character type of "mid laner" is responsible for battle in the mid lane of the virtual environment.

In the related art, before a battle begins, a user sets a desired team position, and users are matched with the user by using a battle matching mechanism to form a team. After the matching completes, a virtual character selection interface is displayed. The interface includes all users in the same team and all virtual characters corresponding to team positions in this round of game of current user accounts. A user selects a specific virtual character that is desired to use in this battle, and a team position previously set by the user is displayed at a position around a user avatar, so as to inform other users in the same team of the team position that the user desires to use in the current battle, thereby avoiding that the battle is affected because users in the same team select the same character type.

However, in the related art, team positions need to be coordinated by users, and the efficiency of selecting characters is low. For example, two users in the same team may want to use virtual characters having the same team position. In this case, the two users need to communicate with each other, to avoid that there are characters having the same team position in the battle, and the process of communication causes unnecessary waste of time.

SUMMARY

The embodiments of this application provide a virtual character selection method and apparatus, a device, a storage medium, and a program product. The technical solutions are as follows.

According to one aspect of this application, a virtual character selection method is provided, applied to a terminal, the method including:

setting first position preference information of a first user account in response to a preference setting operation, the first position preference information indicating a preferred team position of the first user account in a current online game (e.g., a battle game);

displaying a first current team position corresponding to the first user account in response to a battle matching operation, the first current team position is a position played by the first user account in the current online game, and the first current team position is assigned (e.g., allocated) based on the first position preference information;

displaying a plurality of candidate virtual characters based on the first current team position; and determining (e.g., assigning), in response to a selection operation performed on a target virtual character in the plurality of candidate virtual characters, the target virtual character as a master character of the first user account in the current battle.

According to another aspect of this application, a virtual character selection apparatus is provided, including:

a setting module, configured to set first position preference information of a first user account in response to a preference setting operation, the first position preference information indicating a preferred team position of the first user account in a current battle;

a display module, configured to display a first current team position of the first user account in response to a battle matching operation, the first current team position being a team position acted by the first user account in the current battle, and the first current team position being allocated based on the first position preference information, the display module being further configured to display a plurality of candidate virtual characters, the candidate virtual character being displayed based on the first current team position; and a determination module, configured to determine, in response to a selection operation performed on a target virtual character in the plurality of candidate virtual characters, the target virtual character as a master character of the first user account in the current battle.

According to another aspect of this application, a computer device is provided, including a processor and a memory, the memory storing at least one instruction, at least one segment of program, a code set or an instruction set, the at least one instruction, the at least one segment of program, the code set or the instruction set being loaded and executed by the processor to implement the virtual character selection method according to the foregoing aspect.

According to another aspect of this application, a computer-readable storage medium is provided, storing at least one segment of program code, the at least one segment of program code being loaded and executed by a processor to implement the virtual character selection method according to the foregoing aspect.

According to another aspect of this application, a non-transitory computer program product or a computer program is provided, including computer instructions, the computer instructions being stored in a computer-readable storage medium. A processor of a computer device reads the computer instructions from the computer-readable storage medium, and executes the computer instructions to cause the computer device to perform the virtual character selection method according to the foregoing aspect.

The technical solutions provided in the embodiments of this application produce at least the following beneficial effects:

Before a battle officially begins, a server determines a current team position for a user account, so that when a user begins to select a specific target virtual character, a current team position to be used in this round of game is already determined, which can not only avoid coordination and selection of team positions after team matching, but also can simplify the process of team matching, thereby improving the efficiency of team matching.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
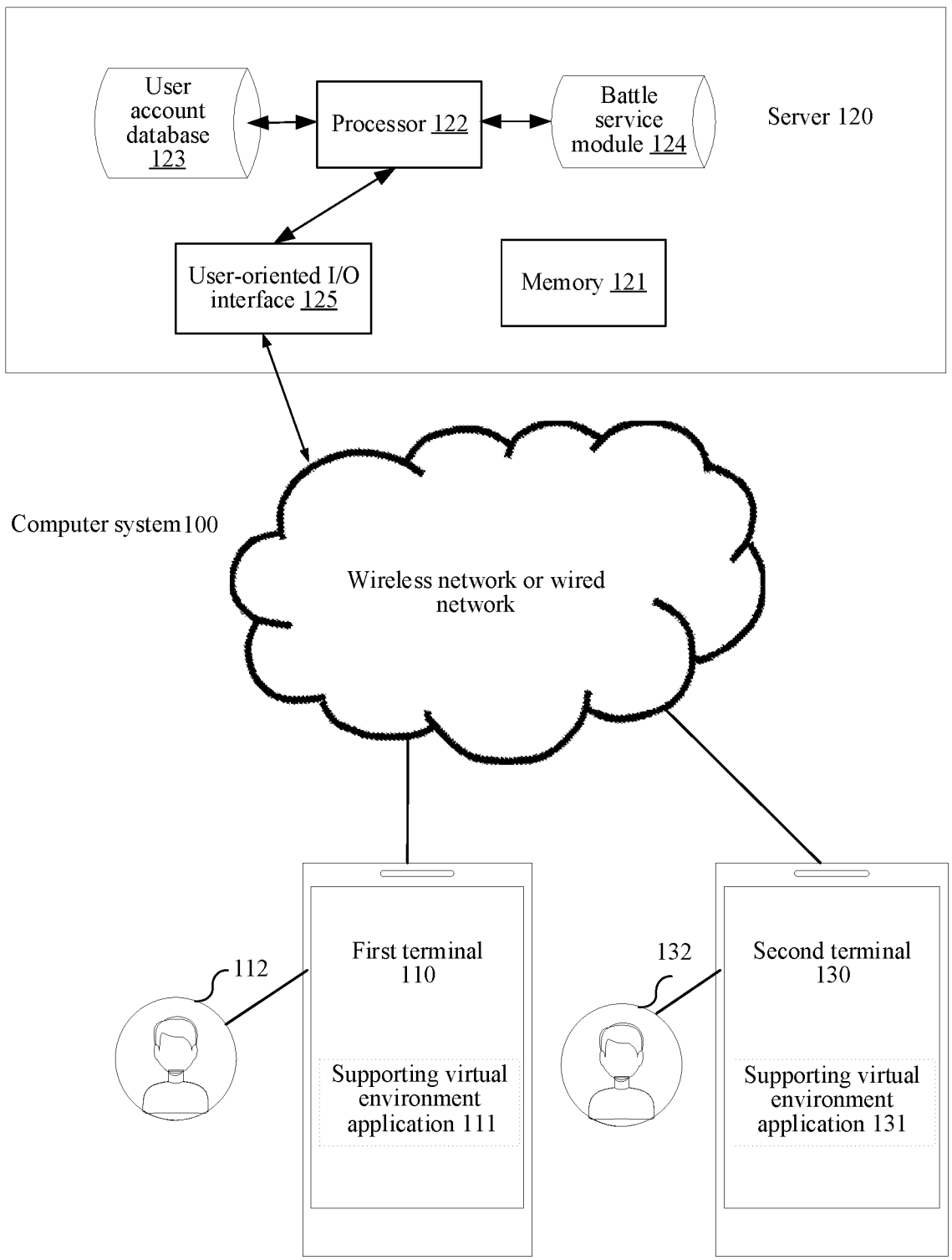
FIG. 1 is a schematic diagram of a computer system according to an exemplary embodiment of this application.

To make the objectives, technical solutions, and advantages of this application clearer, the following further describes implementations of this application in detail with reference to the accompanying drawings.

First, terms involved in the embodiments of this application are introduced:

A multiplayer online battle arena (MOBA) game is a game in which several forts are provided in a virtual world, and users in different teams control virtual characters to battle in the virtual world, occupy forts, or destroy forts of the opposing team. For example, in the MOBA game, the users may be divided into two opposing teams. The virtual characters controlled by the users are scattered in the virtual world to compete against each other, and the victory condition is to destroy or occupy all enemy forts. The MOBA game takes place in rounds. The duration of a round of the MOBA game is from a time point at which the game starts to a time point at which the victory condition is met.

A first person shooting (FPS) game is a game in which several forts are provided in a virtual world, and users in different teams control virtual characters to battle in the virtual world, occupy forts, destroy forts of the opposing team, or kill all or a part of characters of the opposing team. Generally, in the FPS game, the user plays the game in a first-person perspective. Alternatively, the user may play the game in a third-person perspective. For example, in the FPS game, the users may be divided into two opposing teams. The virtual characters controlled by the users are scattered in the virtual world to compete against each other, and the victory condition is to kill all enemy users. The FPS game takes place in rounds. The duration of a round of the FPS game is from a time point at which the game starts to a time point at which the victory condition is met.

A simulation game (SLG) is a type of game in which virtual resources are provided in a virtual world, to simulate the real world. For example, in the SLG, a plurality of users may be divided into a single team, to collaboratively complete designated tasks. There is generally no victory condition in a round of the SLG.

Battle matching is a process of allocating at least two user accounts to the same battle.

Current team position: in the embodiments of this application, there are at least two division manners of the current team position: 1. If the current team position is classified according to a character lane, the current team position indicates a character lane of a user account in a current battle. The character lane is classified according to a battle position of a virtual character in the battle. For example, in a 5V5 battle of the MOBA game, the character lane includes at least one of a top lane, a mid lane, a bottom lane, a jungle, and a support. 2. If the current team position is classified according to a character position, the current team position indicates a character position of a user account in a current battle. The character position is classified according to a responsibility took by a virtual character in a team. For example, in a 5V5 battle of the MOBA game, the team positions may include at least one of a top laner, a mid laner, a jangler, an archer, and a support. In another example, in an FPS game in which teams battle against each other, the team positions may include at least one of a gunner, a sniper, a medical solider, engineering corps, a missile squad, a storm trooper, a driver, a commander.

FIG. 1 is a schematic diagram of a computer system according to an exemplary embodiment of this application. The computer system 100 may include: a first terminal 110, a server 120, and a second terminal 130.

An application 111 supporting a virtual environment is run on the first terminal 110, and the application 111 may be a multiplayer online battle application. When the first terminal runs the application 111, a user interface of the application 111 is displayed on a screen of the first terminal 110. The application 111 may be any one of a military simulation application, a MOBA game, an escape shooting game, and a SLG. In this embodiment, an example in which the application 111 is a MOBA game is used for description. The first terminal 110 is a terminal used by a first user 112. The first user 112 uses the first terminal 110 to control a first virtual object located in the virtual environment to perform activities, and the first virtual object may be referred to as a master virtual character of the first user 112. The activities of the first virtual object include, and are not limited to: at least one of adjusting body postures, crawling, walking, running, riding, jumping, shooting, attacking, and releasing skills. For example, the first virtual object is a first virtual character, such as a simulated character or a cartoon character.

An application 131 supporting a virtual environment is run on the second terminal 130, and the application 131 may be a multiplayer online battle application. When the second terminal 130 runs the application 131, a user interface of the application 131 is displayed on a screen of the second terminal 130. The client may be any one of a military simulation program, a MOBA game, an escape shooting game, and a SLG. In this embodiment, an example in which the application 131 is a MOBA game is used for description. The second terminal 130 is a terminal used by a second user 132. The second user 132 uses the second terminal 130 to control a second virtual object located in the virtual environment to perform activities, and the second virtual object may be referred to as a master virtual character of the second user 132. For example, the second virtual object is a second virtual character, such as a simulated character or a cartoon character.

In some embodiments, the first virtual object and the second virtual object are located in the same virtual world. In some embodiments, the first virtual object and the second virtual object may belong to the same team, the same group, or the same organization, have a friend relationship with each other, or have a temporary communication permission. In some embodiments, the first virtual object and the second virtual object may belong to different teams, different groups, or different organizations, or have a hostile relationship with each other.

In some embodiments, the applications run on the first terminal 110 and the second terminal 130 are the same, or the applications run on the two terminals are the same type of applications on different operating system platforms (Android or IOS). The first terminal 110 may generally refer to one of a plurality of terminals, and the second terminal 130 may generally refer to another one of a plurality of terminals. In this embodiment, only the first terminal 110 and the second terminal 130 are used as an example for description. The first terminal 110 and the second terminal 130 are of the same or different device types, the device type including at least one of a smartphone, a tablet computer, an e-book reader, a portable media player, a laptop portable computer, and a desktop computer.

FIG. 1 shows only two terminals. However, a plurality of other terminals may access the server 120 in different embodiments. In some embodiments, one or more terminals may be terminals corresponding to a developer. A platform for developing and editing the application supporting the virtual environment is installed on the terminal. A developer may edit and update the application on the terminal, and transmit an updated application package to the server 120 through a wired or wireless network. The first terminal 110 and the second terminal 130 may download the application package from the server 120 to update the application.

The first terminal 110, the second terminal 130, and the another terminal are connected to the server 120 through a wireless network or a wired network.

The server 120 includes at least one of one server, a server cluster formed by a plurality of servers, a cloud computing platform, and a virtualization center. The server 120 is configured to provide a backend service for an application supporting a 3D virtual environment. In some embodiments, the server 120 is responsible for primary computing work, and the terminal is responsible for secondary computing work; or the server 120 is responsible for secondary computing work, and the terminal is responsible for primary computing work; or the server 120 and the terminal perform collaborative computing by using a distributed computing architecture between each other.

In a schematic example, the server 120 includes a memory 121, a processor 122, a user account database 123, a battle service module 124, and a user-oriented input/output (I/O) interface 125. The processor 122 is configured to load instructions stored in the server 120, and process data in the user account database 123 and the battle service module 124. The user account database 123 is configured to store data of user accounts used by the first terminal 110, the second terminal 130, and the another terminal, for example, avatars of the user accounts, nicknames of the user accounts, levels of the user accounts, and service zones of the user accounts. The battle service module 124 is configured to provide a plurality of battle rooms for the users to battle, for example, a 1V1 battle room, a 3V3 battle room, a 5V5 battle room, and the like. The user-oriented I/O interface 125 is configured to establish communication between the first terminal 110 and/or the second terminal 130 by using a wireless network or a wired network for data exchange.

Figure 2:
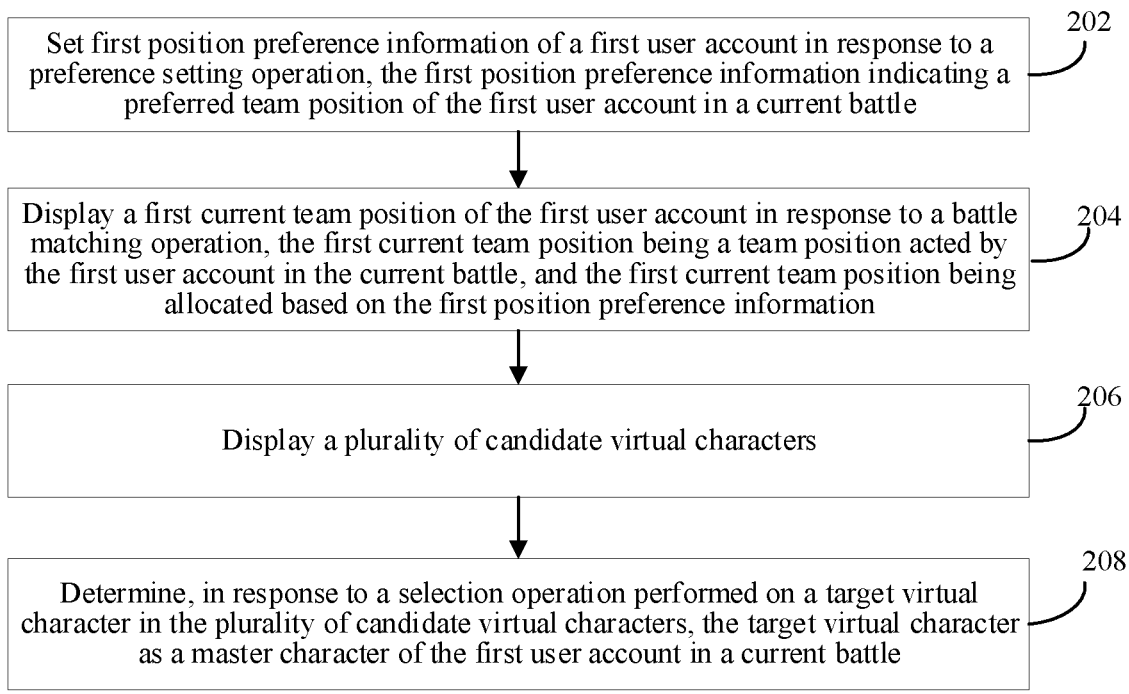
FIG. 2 is a schematic flowchart of a virtual character selection method according to an exemplary embodiment of this application.

FIG. 2 is a schematic flowchart of a virtual character selection method according to an exemplary embodiment of this application. The method may be performed by the terminal 110 or the terminal 130 shown in FIG. 1. The method includes the following steps:

Step 202. Set first position preference information of a first user account in response to a preference setting operation, the first position preference information indicating a preferred team position of the first user account in a current battle.

The preference setting operation is used for setting a preferred team position of the first user account in a current battle. The preference setting operation may be pressing one or more preset physical buttons to set the preferred team position of the first user account in the current battle. Alternatively, the preference setting operation may be performed by using signals generated by long pressing, tapping, double tapping, and/or sliding a designated region on a touch screen.

The first position preference information indicates the preferred team position of the first user account in the current battle.

For example, in a MOBA game, if a user prefers to being a top laner, position preference information set by the user indicates that the user prefers to being a top laner.

In some embodiments, a setting process of the preference setting operation may be that: after receiving the preference setting operation, the terminal determines first position preference information of the first user account based on the preference setting operation, displays the first position preference information in a preference setting interface based on the first position preference information, and simultaneously transmits the first position preference information to the server, so as to ensure that the first position preference information of the first user account in the server is the same as that in the terminal.

In some embodiments, the first position preference information in this embodiment includes at least the following three cases:

1. The first position preference information includes a preference priority of a plurality of team positions set by the first user account.

When the first position preference information includes the preference priority of the plurality of team positions set by the first user account, this step may be replaced with the following steps: displaying a sorting interface of the team positions; setting a preference priority of the team positions in response to the sorting operation performed on the team positions. In this way, a sorting situation of the team positions displayed after the sorting operation is determined as the preference priority of the team positions.

The first current team position is the $m^{th}$ team position in the preference priority of the team positions, the $m^{th}$ team position being a team position when a server matches, based on the preference priority of the team positions, a group of second team accounts having different team positions for the first user account, and m is a positive integer.

Schematically, the preference priority of the team positions may be a preference order of the plurality of team positions. Schematically, a preference priority of the team positions corresponding to the first user account is: mid lane>top lane>bottom lane>support>jungle>position covering (e.g., in the following order). Therefore, a corresponding server needs to first allocate the team position of "mid lane" to the first user account.

2. The first position preference information includes a currently recommended team position of the first user account.

The currently recommended team position is at least one of the team positions, and the currently recommended team position is a team position selected by the user from current candidate team positions.

When the first position preference information includes the currently recommended team position of the first user account, this step may be replaced with the following steps: displaying candidate team positions; and determining, in response to a selection operation performed on any team position in the candidate team positions, a target team position indicated by the selection operation as the currently recommended team position.

The first current team position is the same as the currently recommended team position when the server successfully matches, according to the currently recommended team position, a group of second team accounts having different team positions for the first user account. The first current team position is different from the currently recommended team position when the server fails to match, according to the currently recommended team position, a group of second team accounts having different team positions for the first user account.

3. The first position preference information includes position covering information of the first user account.

The position covering information is used for indicating that the currently recommended team position of the first user account is determined by performing position covering according to second current team positions of second user accounts, the second user accounts being user accounts in a same team as the first user account. To be specific, the position covering information is used for indicating that the server needs to determine the first current team position corresponding to the first user account based on the second current team positions corresponding to the second user accounts.

When the first position preference information includes the position covering information of the first user account, this step may be replaced with the following steps: displaying candidate team positions and a position covering control, the position covering control being configured to select a team position that is not selected by the second user accounts as the currently recommended team position, that is, determine a team position that is not selected by the second user accounts as the currently recommended team position; and determining a covered position as the currently recommended team position in response to a selection operation performed on the position covering control, the covered position being a team position other than the second current team positions.

For example, in a MOBA Game, if team positions selected by the second user accounts are a mid laner, a top laner, a jangler, and a support, only a team position of an archer is not selected, so that the server sets the archer as the currently recommended team position of the user account.

Step 204. Display a first current team position of the first user account in response to a battle matching operation, the first current team position being a team position acted by the first user account in the current battle, and the first current team position being allocated based on the first position preference information.

In some embodiments, second user accounts and account information corresponding to the second user accounts are displayed in response to the battle matching operation, the second user accounts being user accounts in a same team as the first user account, the second user accounts being allocated for the first user account in the current battle, and the second user accounts being matched based on the first position preference information. The account information corresponding to the second user accounts may be an account name, an account avatar, or the like.

In some embodiments, a first current team position allocated for the first user account in the current battle is displayed in response to a battle matching operation, the first current team position being allocated based on the first position preference information.

In some embodiments, the process of allocating the first current team position may be that: after receiving a battle matching operation, the terminal may transmit a battle matching instruction to the server, and the server matches at least one second user account and a first current team position for the first user account based on the first position preference information of the first user account, and further feeds second user account information of the at least one matched second user account and the first current team position back to the terminal.

In some embodiments, a second current team positions allocated for the second user accounts in the current battle are displayed, the second current team positions being allocated based on second position preference information set by the second user accounts, and the second position preference information indicating preferred team positions of the second user accounts in the current battle.

The second current team positions indicate team positions corresponding to characters used by user accounts other than the first user account in the current battle.

Step 206. Display a plurality of candidate virtual characters.

The candidate virtual characters refer to virtual characters that are candidate in the current battle, and the candidate virtual characters pertain to (e.g., belong to) the first current team position. For example, in a MOBA game, a virtual character 1, a virtual character 2, and a virtual character 3 corresponding to the mid laner are displayed.

In some embodiments, candidate virtual characters may be displayed in a virtual character selection interface based on the first current team position.

In some embodiments, the process of displaying the candidate virtual characters based on the first current team position may be that: after receiving the first current team position fed back by the server, the terminal may determine, based on the first current team position, a plurality of candidate virtual characters pertaining to the first current team position, and display the candidate virtual characters in a virtual character selection interface. In some embodiments, after determining the first current team position allocated for the first user account, the server may determine a plurality of candidate virtual characters pertaining to the first current team position, and feed the first current team position and the plurality of candidate virtual characters back to the terminal, so that the terminal may display the first current team position and display the candidate virtual characters in the virtual character selection interface.

In some embodiments, during display of the virtual character selection interface, the candidate virtual characters corresponding to the first current team position may be highlighted, the virtual character selection interface being used for displaying candidate virtual characters of the first user account in the current battle. To be specific, the candidate virtual characters pertaining to the first current team position are highlighted in the virtual character selection interface, and candidate virtual characters that do not belong to the first current team position are not highlighted.

In some embodiments, only the candidate virtual characters corresponding to the first current team position are displayed in the virtual character selection interface, and candidate virtual characters that do not belong to the first current team position are not displayed.

In some embodiments, during displaying of the virtual character selection interface, the candidate virtual characters corresponding to the first current team position are displayed at first k positions of candidate virtual characters in the current battle. To be specific, the candidate virtual characters pertaining to the first current team position are displayed at first k positions of candidate virtual characters in the virtual character selection interface.

In some embodiments, the current team position is classified according to a character lane. The character lane is classified according to a battle position of a virtual character in the battle. For example, in a 5V5 battle of the MOBA game (e.g., there are 5 players on each team), the character lane includes at least one of a top lane, a mid lane, a bottom lane, a jungle, and a support.

In some embodiments, the current team position is classified according to a character position. The character position is classified according to a responsibility took by a virtual character in a team. For example, in a 5V5 battle of the MOBA game, the team positions may include at least one of a top laner, a mid laner, a jangler, an archer, and a support. In another example, in an FPS game in which teams battle against each other, the team positions may include at least one of a gunner, a sniper, a medical solider, engineering corps, a missile squad, a storm trooper, a driver, a commander.

In some embodiments, before the candidate virtual characters corresponding to the first current team position are displayed, a team position notification interface is displayed, the team position notification interface including the current team position.

In some embodiments, the team position notification interface further includes a recommended virtual character, the recommended virtual character pertaining to the current team position. The recommended virtual character is obtained through a default value of the server, or is obtained through a historical record of the first user account, or is obtained through custom settings of the first user account.

In some embodiments, candidate virtual characters that are recommended are identified in the virtual character selection interface based on the first current team position.

In some embodiments, only the current team position allocated by the server for the first user account in the current battle is displayed.

In some embodiments, only candidate virtual characters corresponding to the current team position are displayed.

In some embodiments, only the current team position allocated by the server for the first user account in the current battle is displayed, and during displaying of other user interfaces, the candidate virtual characters corresponding to the current team position are displayed.

In some embodiments, only the candidate virtual characters corresponding to the current team position are displayed, and during displaying of other user interfaces, the current team position allocated by the server for the first user account in the current battle is displayed.

Step 208. Determine, in response to a selection operation performed on a target virtual character in the plurality of candidate virtual characters, the target virtual character as a master character of the first user account in the current battle.

The selection operation is used for determining a virtual character used by the first user account in the current battle. The selection operation may be pressing one or more preset physical buttons to determine a virtual character used by a user account in the current battle. Alternatively, the selection operation may be performed by using signals generated by long pressing, tapping, double tapping, and/or sliding a designated region on a touch screen.

The target virtual character is a master character of the first user account in the current battle. The target virtual character is any character in the candidate virtual characters.

In some embodiments, in response to a selection operation performed on a target virtual character in the candidate virtual characters, the target virtual character is highlighted, and the target virtual character is used as a master character of the first user account in the current battle.

In conclusion, in this embodiment, position preference information is set by a user, and a server determines a current team position for a first user account, so that when the user begins to select a specific target virtual character, a current team position that is to be used is already determined, which can not only avoid coordination and selection of team positions after team matching, but also can simplify the process of team matching, thereby improving the efficiency of team matching.

In the following embodiments, because in some actual situations, the user does not actively set position preference information, the server needs to actively recommend a current team position for the user.

Figure 3:
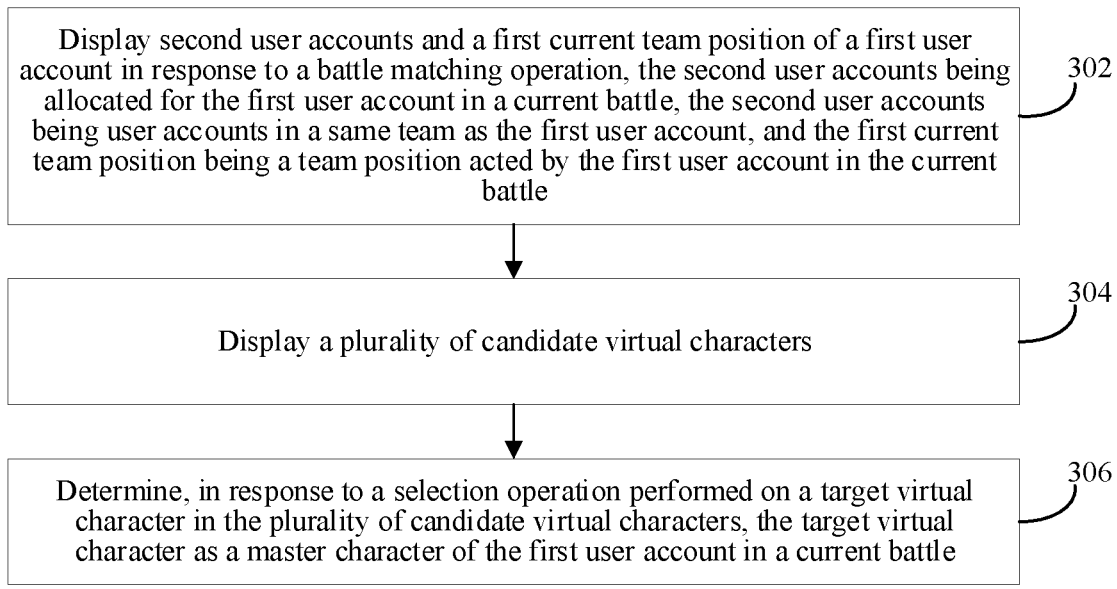
FIG. 3 is a schematic flowchart of a virtual character selection method according to an exemplary embodiment of this application.

FIG. 3 is a schematic flowchart of a virtual character selection method according to an exemplary embodiment of this application. The method may be performed by the terminal 110 or the terminal 130 shown in FIG. 1. The method includes the following steps:

Step 302. Display second user accounts and a first current team position of a first user account in response to a battle matching operation, the second user accounts being allocated for the first user account in a current battle, the second user accounts being user accounts in a same team as the first user account, and the first current team position being a team position acted by the first user account in the current battle.

The battle matching operation is used for matching other user accounts participating in the current battle, including user accounts in a same team and user accounts in different teams, for the first user account. The battle matching operation may be pressing one or more preset physical buttons to match other user accounts participating in the current battle. Alternatively, the battle matching operation may be performed by using signals generated by long pressing, tapping, double tapping, and/or sliding a designated region on a touch screen.

In some embodiments, the battle includes at least two teams. The teams may have a hostile relationship or a cooperation relationship with each other. Alternatively, the teams may have no direct relationship. For example, the battle includes a team 1, a team 2, and a team 3. The team 1 and the team 2 have a cooperation relationship with each other, the team 1 and the team 3 have a hostile relationship with each other, but the team 2 and the team 3 have no direct relationship.

The second user accounts are user accounts in a same team as the first user account. In some embodiments, the second user accounts and the first user account are friends, or the second user accounts and the first user account are strangers.

The first current team position refers to a team position used by the first user account in the current battle.

In some embodiments, the current team position is classified according to a character lane. The character lane is classified according to a battle position of a virtual character in the battle. For example, in a 5V5 battle of the MOBA game, the character lane includes at least one of a top lane, a mid lane, a bottom lane, a jungle, and a support.

In some embodiments, the current team position is classified according to a character position. The character position is classified according to a responsibility took by a virtual character in a team. For example, in a 5V5 battle of the MOBA game, the team positions may include at least one of a top laner, a mid laner, a jangler, an archer, and a support. In another example, in an FPS game in which teams battle against each other, the team positions may include at least one of a gunner, a sniper, a medical solider, engineering corps, a missile squad, a storm trooper, a driver, a commander.

In some embodiments, when the second user accounts and a current team position of the user account allocated by the server for the first user account in current battle are received, receiving success information is displayed, the receiving success information indicating that the current user account has successfully matched the second user accounts of the current battle. Matching success information may be displayed in at least one of a word form, a pattern form, or an animation form. This is not limited in this application.

Figure 4:
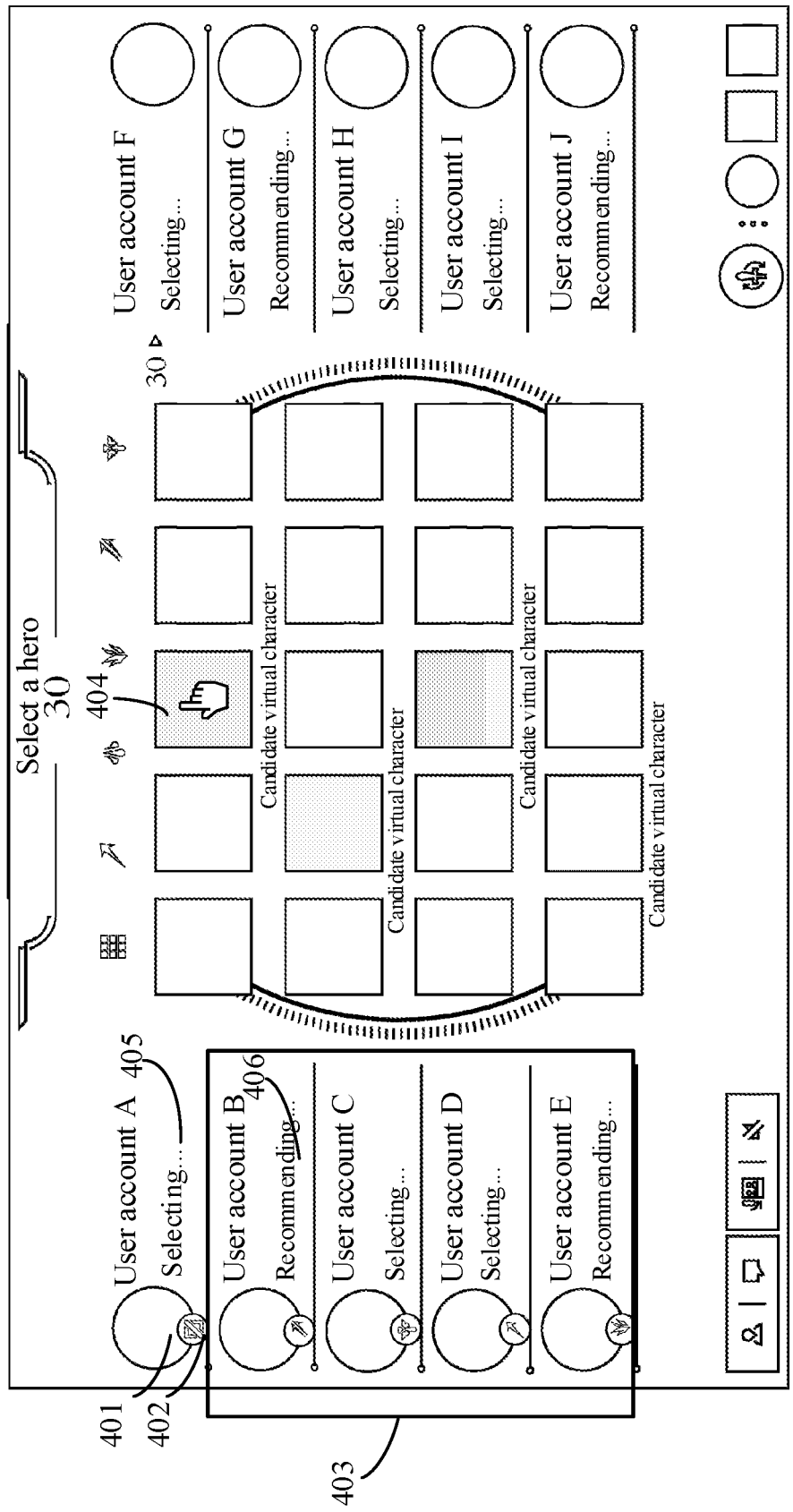
FIG. 4 is a schematic diagram of displaying candidate virtual characters according to an exemplary embodiment of this application.

For example, as shown in FIG. 4, a second user account 403 (user accounts in the black box all represent the second user accounts, and are highlighted by using the black box for concise description, and the black box does not actually exist) is a user account in a same team as the first user account 401 in the current battle.

For example, an icon 402 represents the current team position of the first user account 401.

In some embodiments, the process in which the terminal displays the second user accounts and the first current team position is that: after receiving a battle matching operation, the terminal transmits a battle matching instruction to the server, the corresponding server receives the battle matching instruction, matches second user accounts and a first current team position for the first user account based on the first position preference information of the first user account, and further feeds the second user accounts and the first current team position back to the terminal, and the corresponding terminal displays the first current team position and the second user accounts in a user interface.

Step 304. Display a plurality of candidate virtual characters.

In some embodiments, the candidate virtual characters are displayed in a virtual character selection interface based on the first current team position.

The virtual character selection interface is used for displaying the candidate virtual characters for the user to select.

The candidate virtual characters refer to virtual characters that are candidates in the current battle, and the candidate virtual characters pertain to the first current team position. For example, in a MOBA game, a virtual character 1, a virtual character 2, and a virtual character 3 corresponding to the mid laner are displayed.

In some embodiments, all candidate virtual characters corresponding to the first current team position are displayed.

In some embodiments, some of candidate virtual characters corresponding to the first current team position are displayed.

In some embodiments, candidate virtual characters that are possessed by the user account and that correspond to the first current team position are displayed.

For example, as shown in FIG. 4, candidate virtual characters are displayed on the user interface. Boxes filled with gray in FIG. 4 are all candidate virtual characters. A candidate virtual character 404 is used as an example for description.

Step 306. Determine, in response to a selection operation performed on a target virtual character in the plurality of candidate virtual characters, the target virtual character as a master character of the first user account in the current battle.

The selection operation is used for determining a virtual character used by the first user account in the current battle. The selection operation may be pressing one or more preset physical buttons to determine a virtual character used by a user account in the current battle. Alternatively, the selection operation may be performed by using signals generated by long pressing, tapping, double tapping, and/or sliding a designated region on a touch screen.

The target virtual character is a master character of the first user account in the current battle. The target virtual character is any character in the candidate virtual characters.

In some embodiments, in response to a selection operation performed on a target virtual character in the candidate virtual characters, the target virtual character is highlighted, and the target virtual character is used as a master character of the first user account in the current battle.

In some embodiments, a status identifier is displayed, the status identifier being used for indicating that a user account is processing matters. For example, as shown in FIG. 4, the status identifier 405 is used for indicating that the first user account 401 is selecting a target virtual character. The status identifier 406 is used for indicating that a user account B in the second user account 403 is confirming a current team position.

For example, as shown in FIG. 4, the candidate virtual character 404 is used as a master character of the first user account in the current battle in response to a tapping operation performed on the candidate virtual character 404

In some embodiments, the process of determining the target virtual character may include: after receiving a selection operation performed on the target virtual character, the terminal determines the target virtual character, and reports the target virtual character to the server, the server synchronizes related information of the target virtual character used by the first user account to other clients (other clients include terminals corresponding to user accounts participating in the current battle). In some embodiments, after receiving a selection operation performed on the target virtual character, the terminal transmits a selection verification instruction of the target virtual character to the server. After receiving a feedback instruction of the selection verification instruction, the terminal determines the target virtual character as a master character of the first user account in the current battle, and the server also synchronizes related information of the target virtual character used by the first user account to other clients.

In conclusion, in this embodiment, before a battle officially begins, a server determines a current team position for a first user account, so that when a user begins to select a specific target virtual character, a current team position to be used is already determined, which can not only avoid coordination and selection of team positions after team matching, but also can simplify the process of team matching, thereby improving the efficiency of team matching.

When the server determines the current team position, the server may obtain the current team position by using different methods, which include, but are not limited to, at least one of the following four cases:

1. The first current team position is determined by the server based on a preference priority of a plurality of team positions set by the first user account.
2. The first current team position is determined by the server based on a currently recommended team position transmitted by the first user account.
3. The first current team position is determined after the server performs position covering based on second current team positions of the second user accounts.
4. The first current team position is determined by the server based on a historical battle record of the first user account.

The foregoing four cases are not used to limit this application, and the foregoing four cases may be a combined scheme or may be at least one combination.

When the first current team position is determined by the server according to a team position priority order transmitted by the client, a process of team matching may be simplified, thereby improving the efficiency of team matching. To specify the relationship between the team position priority order and the current team position, an exemplary embodiment is used for description below.

Figure 5:
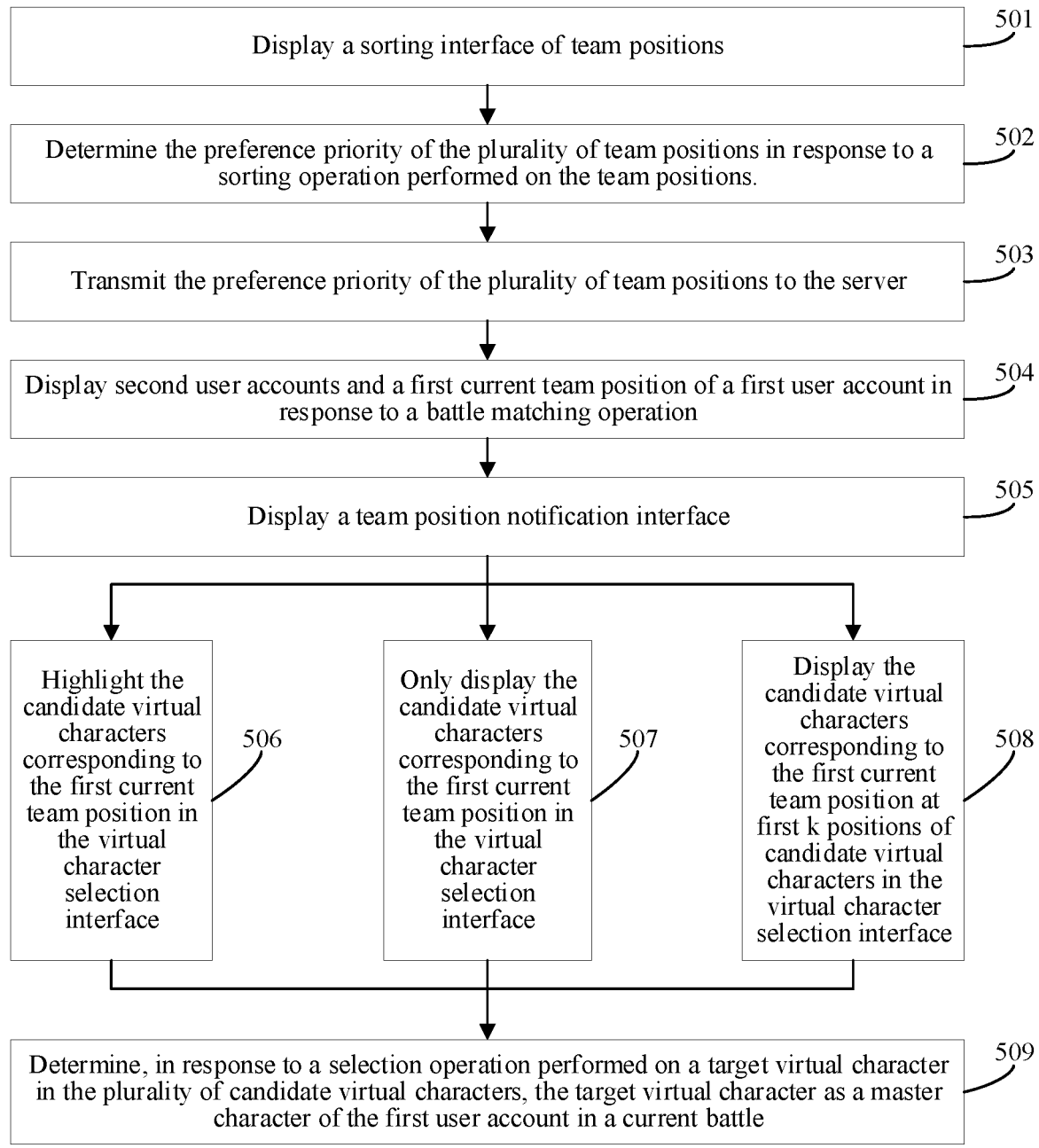
FIG. 5 is a schematic flowchart of a virtual character selection method according to an exemplary embodiment of this application.

FIG. 5 is a schematic flowchart of a virtual character selection method according to an exemplary embodiment of this application. The method may be performed by the terminal 110 or the terminal 130 shown in FIG. 1. The method includes the following steps:

Step 501. Display a sorting interface of the team positions.

The sorting interface is used for displaying the sorted team positions in the current battle. For example, a MOBA game is used as an example for description, the team positions may include at least one of a top laner, a mid laner, a jungler, an archer, and a support, and the four team positions of the top laner, the mid laner, the jungler, the archer, and the support are sequentially displayed in the sorting interface.

In some embodiments, recommended characters corresponding to the team positions are displayed in the sorting interface. The recommended character is obtained through a default value of the server, or is obtained through a historical record of a user account, or is obtained through custom settings of a user account.

Figure 6:
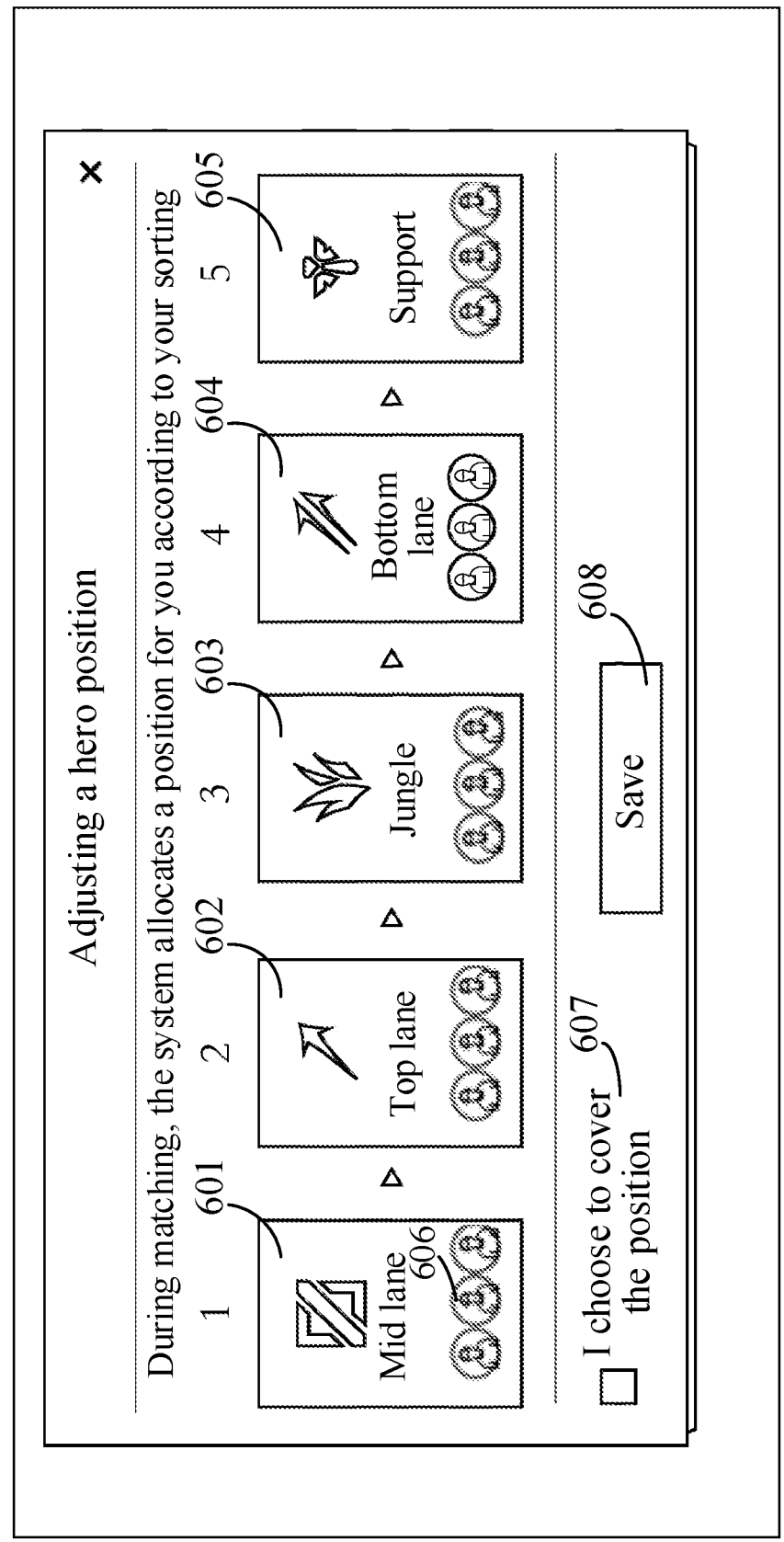
FIG. 6 is a schematic interface diagram of a sorting interface according to an exemplary embodiment of this application.

For example, a MOBA game is used as an example for description, as shown in FIG. 6, the sorting interface includes a team position 601, a team position 602, a team position 603, a team position 604, and a team position 605.

In some embodiments, the sorting interface further includes recommended characters, the recommended characters pertaining to the current team position. The recommended character is obtained through a default value of the server, or is obtained through a historical record of the first user account, or is obtained through custom settings of the first user account. In some embodiments, a specific method of obtaining the recommended characters is set by users.

Step 502. Determine the preference priority of the plurality of team positions in response to a sorting operation performed on the team positions.

The sorting operation is used for adjusting the preference priority of the team positions in the sorting interface. The sorting operation may be pressing one or more preset physical buttons to adjust an order of the team positions in the sorting interface. Alternatively, the sorting operation may be performed by using signals generated by long pressing, tapping, double tapping, and/or sliding a designated region on a touch screen.

The preference priority indicates a team position priority order for matching. The preference priority may be obtained by using the sorting operation of the user, or may be obtained by using a default value of the server.

In some embodiments, the sorting interface further includes a saving control. A team position priority order is determined in response to a trigger operation performed on the saving control. For example, as shown in FIG. 6, the saving control 608 is tapped, to determine a team position priority order.

For example, "top laner-mid laner-jungler-archer-support" is displayed in the sorting interface initially. After the sorting operation, the order of the team positions in the sorting interface is changed to "jungler-archer-top laner-mid laner-support".

Figure 7:
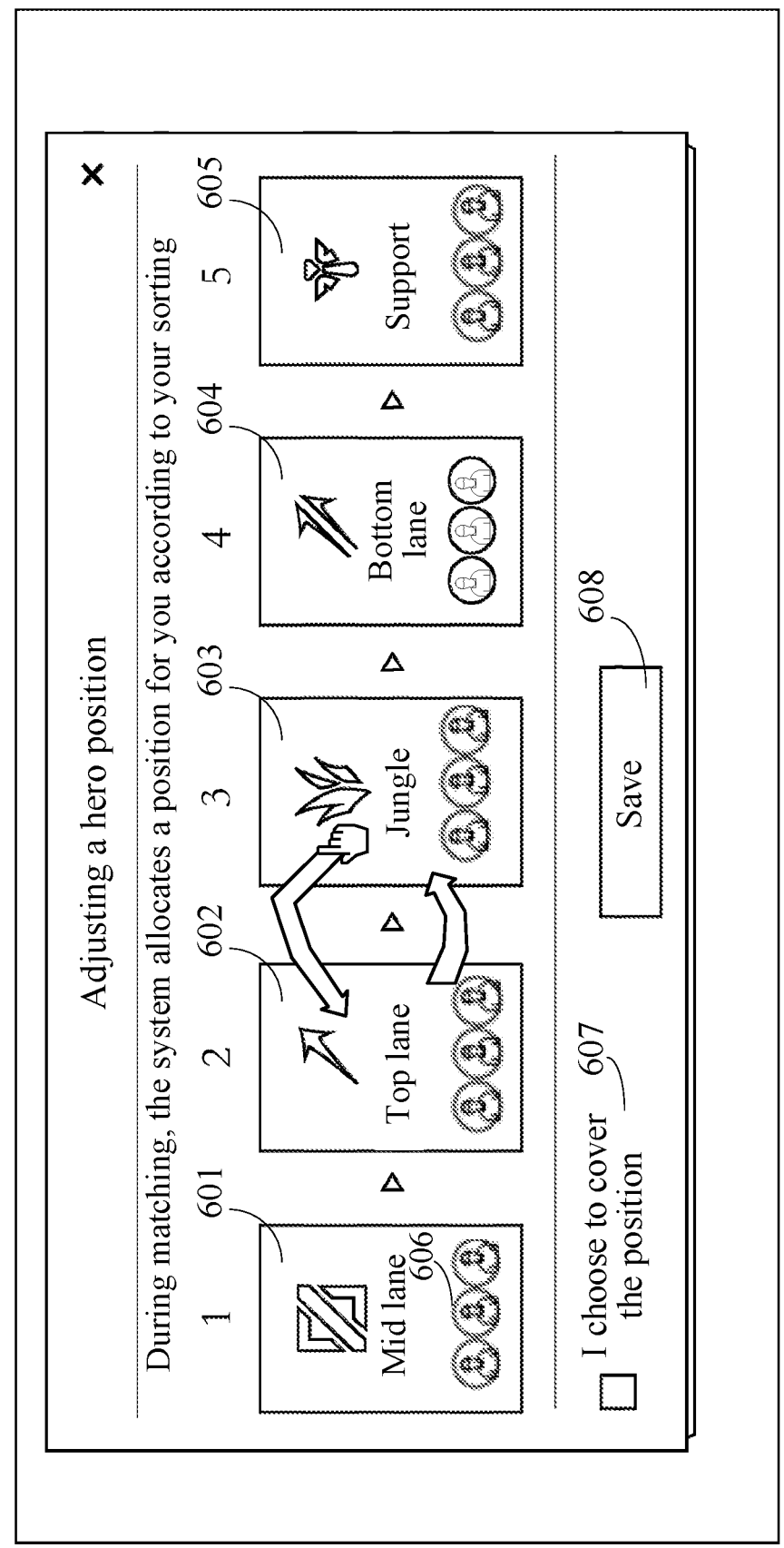
FIG. 7 is a schematic interface diagram of adjusting a sorting interface according to an exemplary embodiment of this application.

For example, as shown in FIG. 7, in response to an exchange operation performed on the team position 602 and the team position 603, priorities of the team position 602 and the team position 603 in the team position priority order are changed.

Step 503. Transmit the preference priority of the plurality of team positions to the server.

The client transmits the team position priority order to the server.

In some embodiments, if a saving control is displayed in the sorting interface, when a trigger operation performed on the saving control in the sorting interface is received, it indicates that the user completes setting of the preference priority of the team positions. The preference priority of the team positions may be determined based on the current order of the team positions in the sorting interface, and the preference priority of the team positions is transmitted to the server, so that the preference priority of the team positions that corresponds to the first user account and that is stored in the server is the same as that in the terminal.

Step 504. Display second user accounts and a first current team position of a first user account in response to a battle matching operation.

The battle matching operation is used for matching other user accounts participating in the current battle, including user accounts in a same team and user accounts in different teams, for the first user account. The battle matching operation may be pressing one or more preset physical buttons to match other user accounts participating in the current battle. Alternatively, the battle matching operation may be performed by using signals generated by long pressing, tapping, double tapping, and/or sliding a designated region on a touch screen.

The second current team positions indicate team positions used by user accounts other than the first user account in the current battle.

In this embodiment, the first current team position is the $m^{th}$ team position in the team position priority order, the $m^{th}$ team position being a team position when a server matches, based on the team position priority order, a group of second team accounts having different team positions for the first user account, and m being a positive integer. For example, m=1.

For example, when the server performs matching for the first user account according to the first team position in the team position priority order, and successfully matches a group of second team accounts having different team positions for the first user account, the 1st team position is used as the first current team position.

For example, when the server performs matching for the first user account according to the $m^{th}$ team position in the preference priority of the team positions, whether the server can successfully match a group of second team accounts having different team positions for the first user account is determined. If the server can successfully match the group of second team accounts, the server uses the $m^{th}$ team position as the first current team position. If the server fails to match the group of second team accounts, the server performs matching for the first user account according to the $(m+1)^{th}$ team position in the preference priority of the team positions.

The second team accounts refer to an account group formed by at least two second user accounts. For example, if a second account 1, a second account 2, and a second account 3 are matched for the first user account, the second team accounts herein refer to an account group formed by the second account 1, the second account 2, and the second account 3.

The group of second team accounts having different team positions herein refers to that there are different team positions between the first user account and the second team accounts, or there are different team positions in positions of the second team accounts. In other words, a team to which the first user account pertains has different team positions. For example, in a MOBA game, if a team position of the first user account is a mid laner, and team positions of the second team accounts are a top laner and a jangler, the foregoing situation in which the first user account successfully matches a group of second team accounts having different team positions is met.

In some embodiments, a virtual character selection interface is display. In response to a selection operation performed on a target virtual character in the virtual character selection interface, the target virtual character is determined. The target virtual character is transmitted to the server.

Second user accounts and a first current team position of a first user account allocated by the server for the first user account in the current battle are obtained in response to a battle matching operation, the first current team position being determined by the server according to a responsibility took by the target virtual character in the team.

Step 505. Display a team position notification interface.

The team position notification interface includes the first current team position.

In some embodiments, the first current team position and a recommended character are displayed in the team position notification interface, the recommended character pertaining to the first current team position. The recommended character is obtained through a default value of the server, or is obtained through a historical record of the first user account, or is obtained through custom settings of the first user account. In some embodiments, a specific method of obtaining the recommended characters is set by users.

Figure 8:
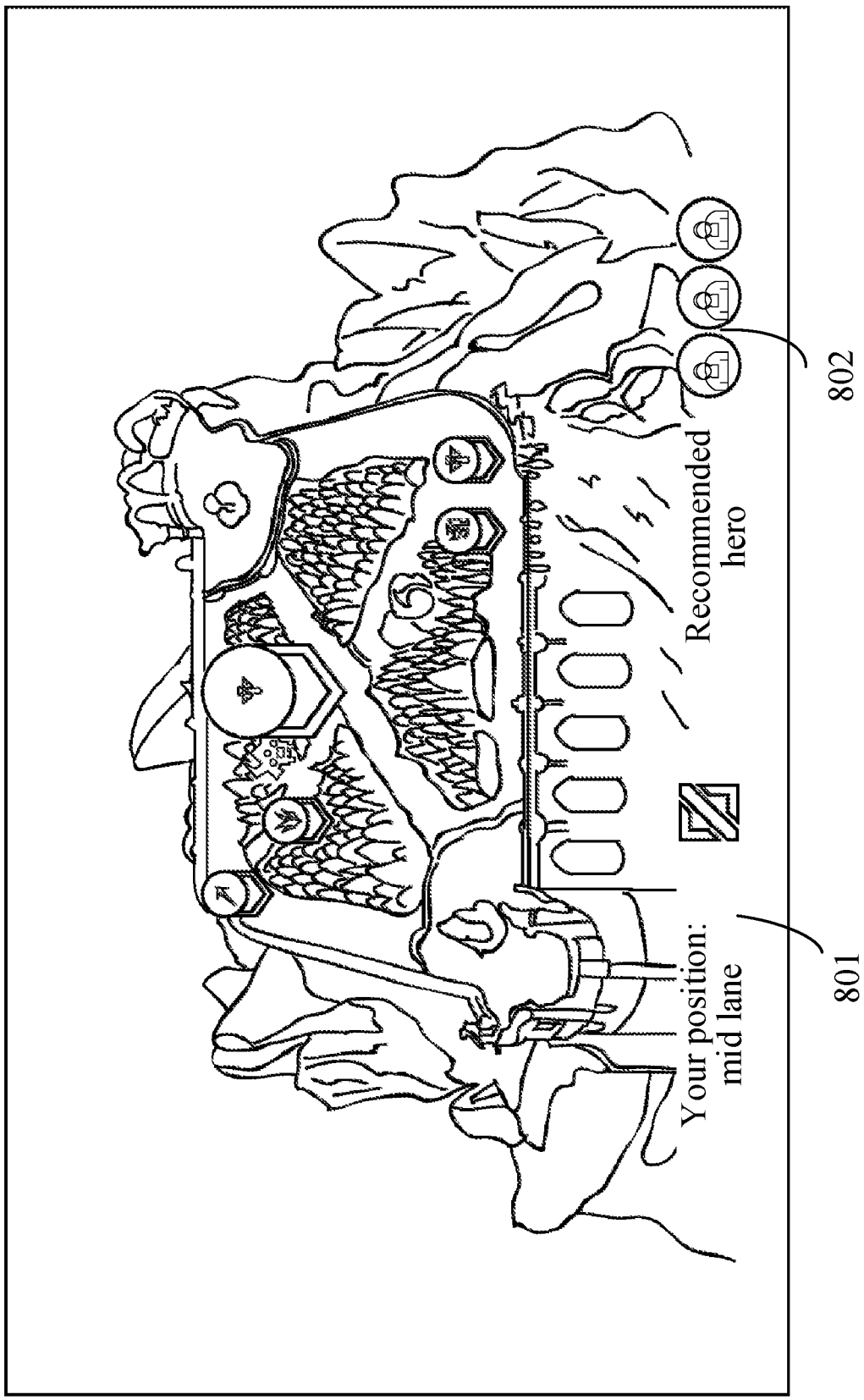
FIG. 8 is a schematic interface diagram of a team position notification interface according to an exemplary embodiment of this application.

For example, as shown in FIG. 8, a marker 801 is used for indicating that the current team position of the first user account in the current battle is a mid lane, and a right icon 802 indicates a recommended character corresponding to the current team position.

Step 506. Highlight the candidate virtual characters corresponding to the first current team position in the virtual character selection interface.

The virtual character selection interface is used for displaying candidate virtual characters of the first user account in the current battle. In some embodiments, the virtual character selection interface is further used for displaying virtual characters corresponding to other team positions of the first user account in the current battle.

In some embodiments, the method of highlighting includes at least one of highlighting, grayscale displaying, and blink displaying.

For example, as shown in FIG. 4, virtual characters of the current battle are displayed, and candidate virtual characters are highlighted (which are highlighted by filling gray in FIG. 4).

In some embodiments, when a trigger operation performed by a user on a virtual character selection control in the team position notification interface is received, a virtual character selection interface is displayed, so that the user may select a target virtual character used for participating in the current battle in the virtual character selection interface.

In some embodiments, after the battle matching completes, the first current team position is determined, that is, the battle is entered to select the target virtual character.

Step 507. Only display the candidate virtual characters corresponding to the first current team position in the virtual character selection interface.

During displaying of the virtual character selection interface, only the candidate virtual characters corresponding to the first current team position are displayed, and virtual characters corresponding to team positions other than the current team position are not displayed.

Step 508. Display the candidate virtual characters corresponding to the first current team position at first k positions of candidate virtual characters in the virtual character selection interface.

During displaying of the virtual character selection interface, the candidate virtual characters corresponding to the current team position are displayed at first k positions of candidate virtual characters in the current battle, and virtual characters corresponding to team positions other than the first current team position are displayed behind the first k positions of candidate virtual characters in the current battle, k being a positive integer.

Schematically, if the candidate virtual characters pertaining to the first current team position include candidate virtual characters 1 to 3, the candidate virtual characters 1 to 3 are displayed at first three positions in the virtual character selection interface.

Step 506, step 507, and step 508 are a combined scheme or at least one combination.

Step 509. Determine, in response to a selection operation performed on a target virtual character in the plurality of candidate virtual characters, the target virtual character as a master character of the first user account in the current battle.

The selection operation performed on the target virtual character in the candidate virtual characters is used for determining a virtual character used by the first user account in the current battle. The selection operation may be pressing one or more preset physical buttons to determine a virtual character used by a user account in the current battle. Alternatively, the selection operation may be performed by using signals generated by long pressing, tapping, double tapping, and/or sliding a designated region on a touch screen.

The target virtual character is a master character of the first user account in the current battle. The target virtual character is any character in the candidate virtual characters.

In conclusion, in this embodiment, before a battle officially begins, a server determines a current team position for a first user account, so that when a user begins to select a specific target virtual character, a current team position to be used is already determined, which can not only avoid coordination and selection of team positions after team matching, but also can simplify the process of team matching, thereby improving the efficiency of team matching.

In addition, a plurality of displaying method are provided, to highlight the candidate virtual characters corresponding to the current team position, so that the user quickly selects the target virtual character, and wrong selection of the user may also be avoided. The team position priority order is determined by the user, so that the generated current team position is possibly an expected position of the user, which can improve the winning rate of the battle.

When the first current team position is determined by the server according to the currently recommended team position transmitted by the client, a process of team matching may be simplified, thereby improving the efficiency of team matching. To specify the relationship between the currently recommended team position and the current team position, an exemplary embodiment is used for description below.

Figure 9:
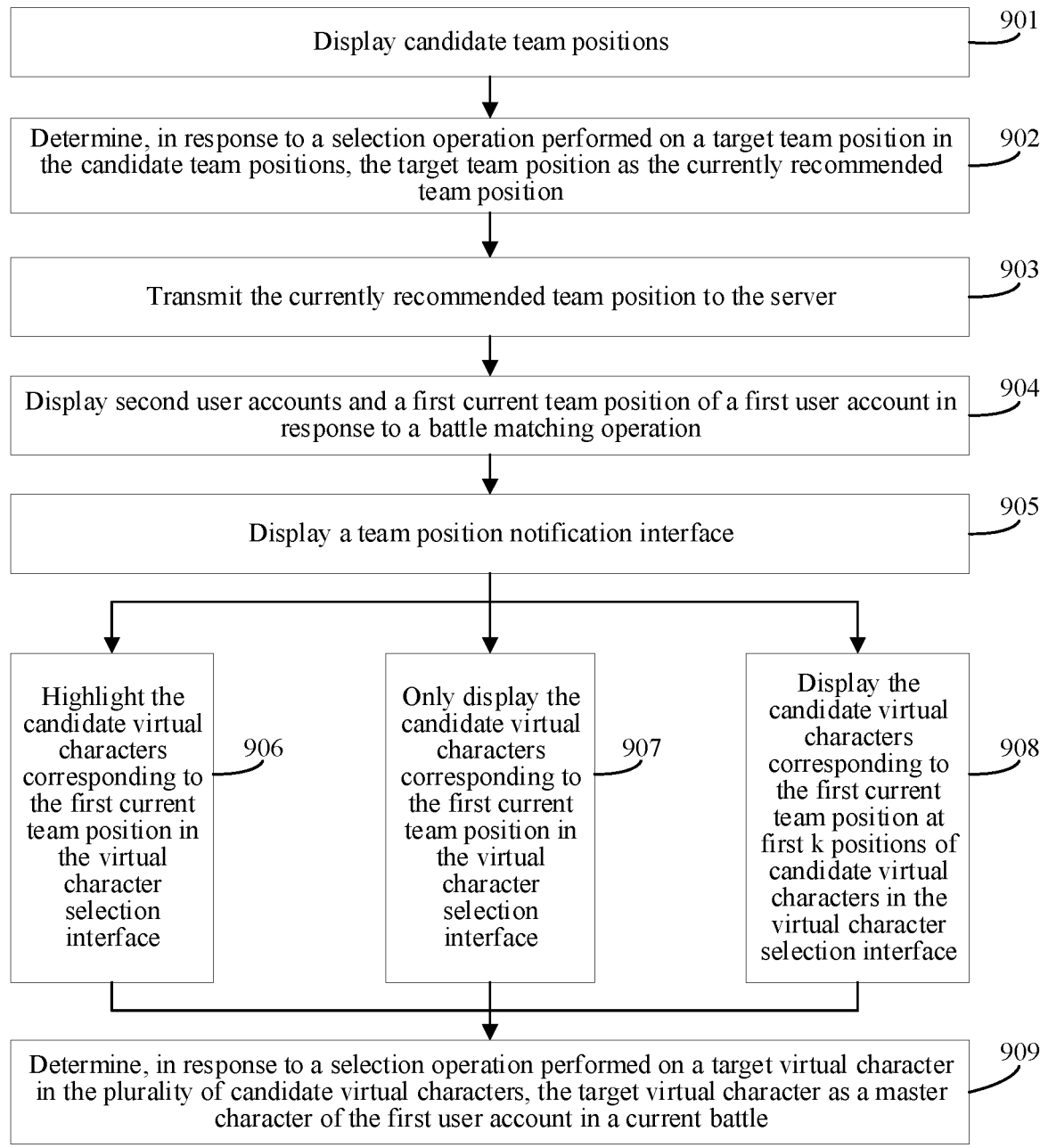
FIG. 9 is a schematic flowchart of a virtual character selection method according to an exemplary embodiment of this application.

FIG. 9 is a schematic flowchart of a virtual character selection method according to an exemplary embodiment of this application. The method may be performed by the terminal 110 or the terminal 130 shown in FIG. 1. The method includes the following steps:

Step 901. Display candidate team positions.

Candidate team positions refer to at least one team positions that can be used in the current battle.

In some embodiments, recommended characters corresponding to the candidate team positions are displayed, the recommended character is obtained through a default value of the server, or is obtained through a historical record of a user account, or is obtained through custom settings of a user account.

Figure 10:
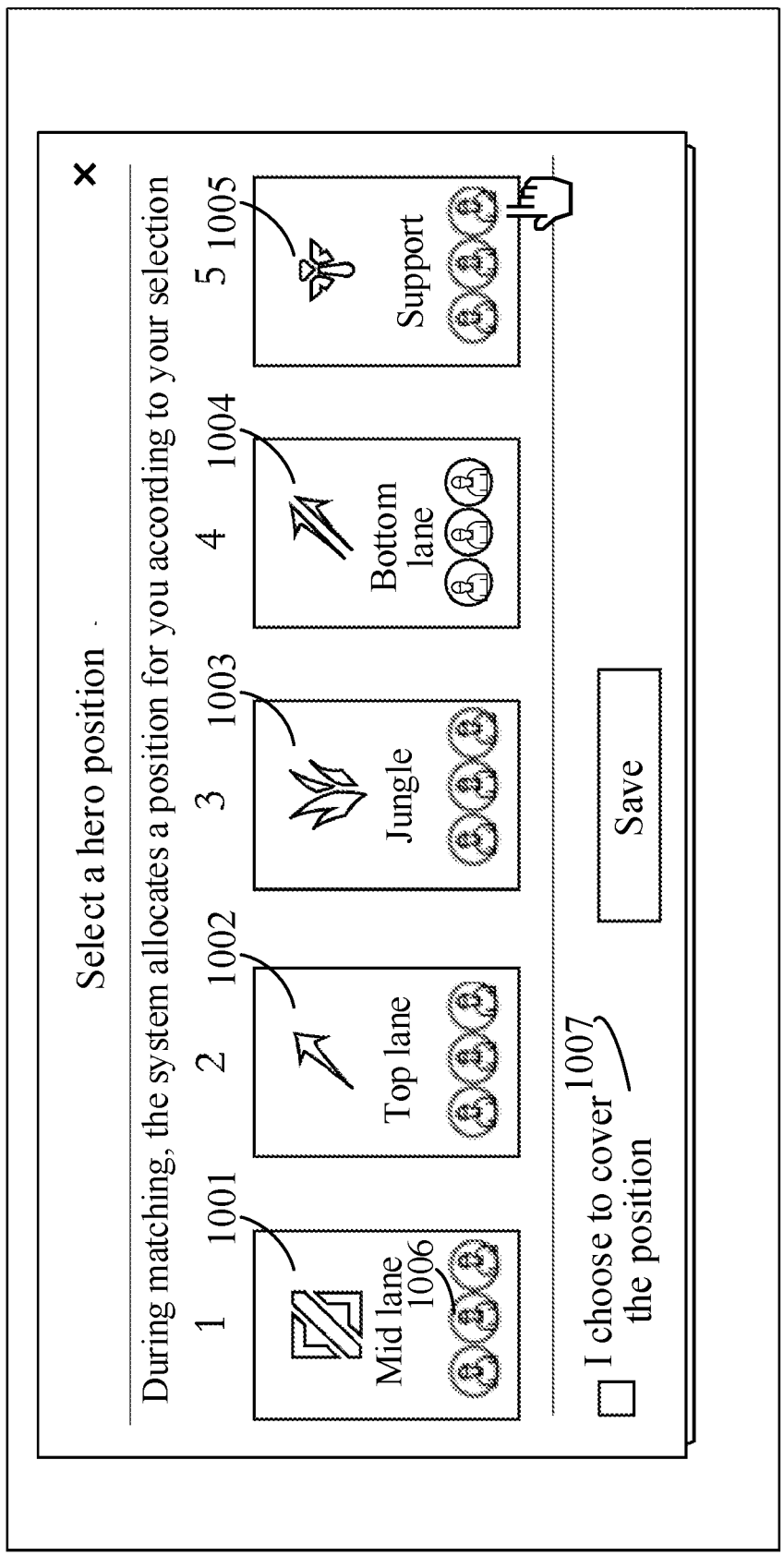
FIG. 10 is a schematic interface diagram of displaying candidate team positions according to an exemplary embodiment of this application.

For example, as shown in FIG. 10, a candidate team position 1001, a candidate team position 1002, a candidate team position 1003, a candidate team position 1004, and a candidate team position 1005 are displayed. A character 1006 is a recommended character corresponding to the candidate team position 1001.

Step 902. Determine, in response to a selection operation performed on a target team position in the candidate team positions, the target team position as the currently recommended team position.

The selection operation performed on any team position in the candidate team positions is used for selecting any team position from the candidate team positions, that is, a target team position is selected from the candidate team positions, and the target team position is determined as the currently recommended team position selected for the user. The selection operation may be pressing one or more preset physical buttons to select any team position from the candidate team positions. Alternatively, the selection operation may be performed by using signals generated by long pressing, tapping, double tapping, and/or sliding a designated region on a touch screen.

The currently recommended team position refers to a team position that is first allocated by the server to the first user account in the current battle.

For example, as shown in FIG. 10, in response to a selection operation performed on the candidate team position 1005, the candidate team position 1005 is determined as the currently recommended team position.

Step 903. Transmit the currently recommended team position to the server.

The client transmits the currently recommended team position to the server.

In some embodiments, after receiving a selection operation performed on a target team position in the candidate team positions, the terminal determines the target team position, that is, the currently recommended team position, and simultaneously transmits the currently recommended team position to the server, so that the currently recommended team position corresponding to the first user account in the server may be the same as the currently recommended team position selected by the user in the terminal.

Step 904. Display second user accounts and a first current team position of a first user account in response to a battle matching operation.

The battle matching operation is used for matching other user accounts participating in the current battle, including user accounts in a same team and user accounts in different teams, for the first user account. The battle matching operation may be pressing one or more preset physical buttons to match other user accounts participating in the current battle. Alternatively, the battle matching operation may be performed by using signals generated by long pressing, tapping, double tapping, and/or sliding a designated region on a touch screen.

In this embodiment, the first current team position is the same as the currently recommended team position when the server successfully matches, according to the currently recommended team position, a group of second team accounts having different team positions for the first user account.

The first current team position is different from the currently recommended team position when the server fails to match, according to the currently recommended team position, a group of second team accounts having different team positions for the first user account.

In some embodiments, when the server fails to match, according to the currently recommended team position, a group of second team accounts having different team positions for the first user account, the first current team position is obtained by the server by using a historical battle record of the user account, and the first current team position is different from the currently recommended team position.

In some embodiments, when the server fails to match, according to the currently recommended team position, a group of second team accounts having different team positions for the first user account, the first current team position is obtained by the server according to a situation in which the currently recommended team position is a team position that is not selected by the second user accounts, and the first current team position is different from the currently recommended team position.

In some embodiments, when the server fails to match, according to the currently recommended team position, a group of second team accounts having different team positions for the first user account, the first current team position is obtained by the server, and the first current team position is different from the currently recommended team position.

For example, in a MOBA game, a user sets a mid laner as the currently recommended team position. The server matches second team accounts for the first user account according to the currently recommended team position. When the server successfully matches a group of second team accounts having different team positions, the server allocates the mid laner as a first current team position of the user. When the server fails to match a group of second team accounts having different team positions, the server sets the current team position as another team position.

Optionally, after receiving a battle matching operation, the terminal transmits a battle matching instruction to the server. The corresponding server receives the battle matching instruction, and performs battle matching based on a currently recommended team position transmitted by a first user account. When the matching based on the currently recommended team position succeeds, the currently recommended team position is determined as the first current team position, and is fed back to the terminal, and the terminal displays the first current team position. When the matching based on the currently recommended team position fails, the currently recommended team position is changed to another team position for matching, the another team position is determined as the first current team position and is fed back to the terminal, and the corresponding terminal displays the first current team position.

Step 905. Display a team position notification interface.

For the implementation of this step, reference may be made to step 505, and details are not described again in this embodiment.

Step 906. Highlight the candidate virtual characters corresponding to the first current team position in the virtual character selection interface.

For the implementation of this step, reference may be made to step 506, and details are not described again in this embodiment.

Step 907. Only display the candidate virtual characters corresponding to the first current team position in the virtual character selection interface.

For the implementation of this step, reference may be made to step 507, and details are not described again in this embodiment.

Step 908. Display the candidate virtual characters corresponding to the first current team position at first k positions of candidate virtual characters in the virtual character selection interface.

For the implementation of this step, reference may be made to step 508, and details are not described again in this embodiment.

Step 906, step 907, and step 908 are a combined scheme or at least one combination.

Step 909. Determine, in response to a selection operation performed on a target virtual character in the plurality of candidate virtual characters, the target virtual character as a master character of the first user account in the current battle.

For the implementation of this step, reference may be made to step 509, and details are not described again in this embodiment.

In conclusion, in this embodiment, before a battle officially begins, a server determines a current team position for a first user account, so that when a user begins to select a specific target virtual character, a current team position to be used is already determined, which can not only avoid coordination and selection of team positions after team matching, but also can simplify the process of team matching, thereby improving the efficiency of team matching.

Because the currently recommended team position is selected by the user, the currently recommended team position can meet the requirements of the user. Therefore, the problem of a user not being able to obtain a desired team position is resolved. The methods and systems disclosed herein ensure that the user can obtain a desired team position, thereby improving the user's gaming experience. In addition, a situation whereby players need to "grab" team positions in the game may be reduced, thereby reducing conflicts between the players and creating a friendlier gaming environment.

When the first current team position is determined by the server by performing position covering according to current team positions of the second user accounts, a process of team matching may be simplified, thereby improving the efficiency of team matching. To specify the relationship between position covering and the current team position, an exemplary embodiment is used for description below.

Figure 11:
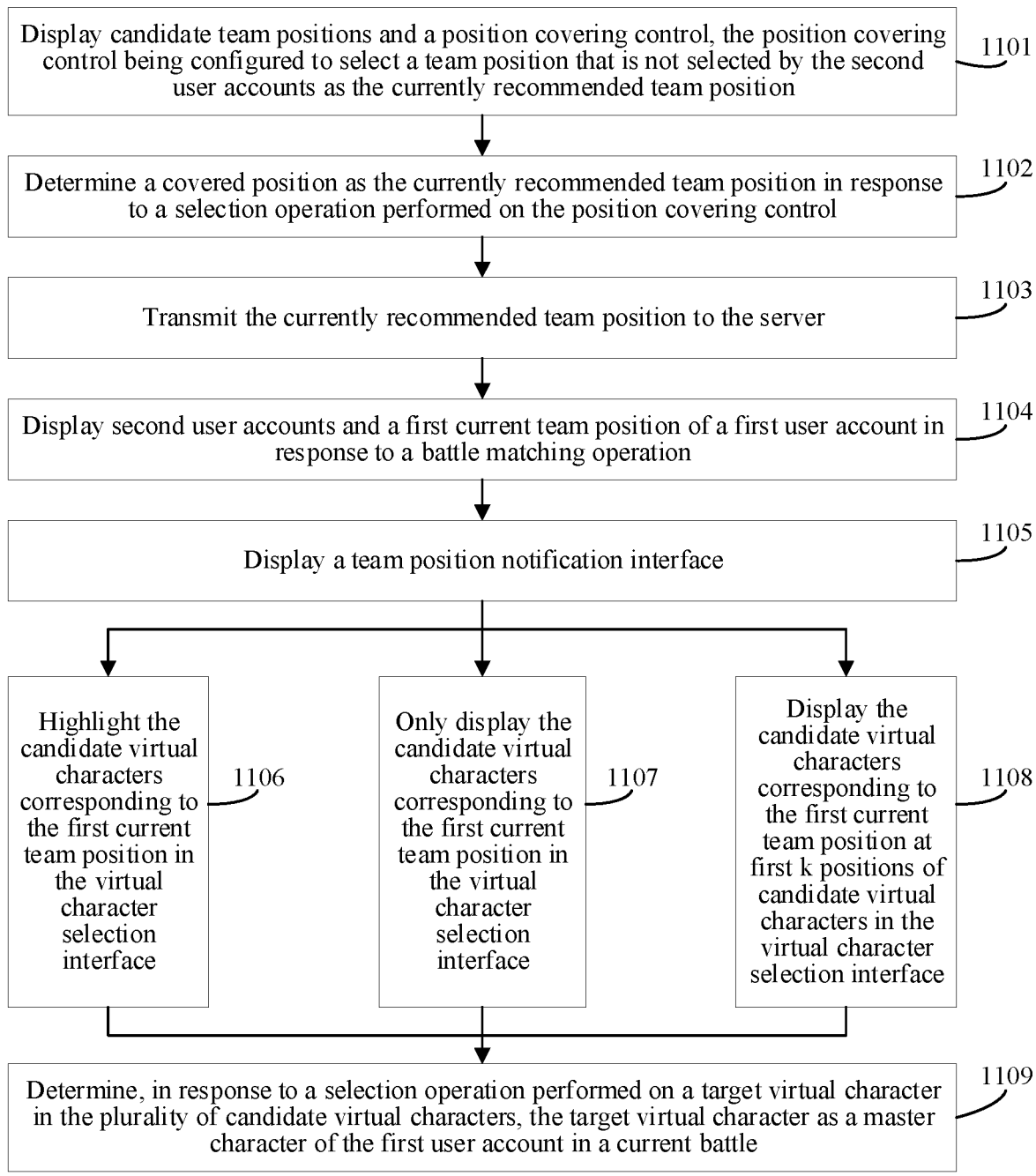
FIG. 11 is a schematic flowchart of a virtual character selection method according to another exemplary embodiment of this application.

FIG. 11 is a schematic flowchart of a virtual character selection method according to an exemplary embodiment of this application. The method may be performed by the terminal 110 or the terminal 130 shown in FIG. 1. The method includes the following steps:

Step 1101. Display candidate team positions and a position covering control, the position covering control being configured to select a team position that is not selected by the second user accounts as the currently recommended team position.

Candidate team positions refer to at least one team positions that can be used in the current battle.

The position covering control is configured to select a team position that is not selected by the second user accounts as the currently recommended team position, that is, determine a team position that is not selected by the second user accounts as the currently recommended team position.

For example, as shown in FIG. 6 and FIG. 7, a position covering control 607 is displayed at a lower left corner of a sorting interface.

For example, as shown in FIG. 10, a position covering control 1007 is displayed at a lower left corner of a user interface.

Step 1102. Determine a covered position as the currently recommended team position in response to a selection operation performed on the position covering control.

The selection operation performed on the position covering control is used for setting the currently recommended team position of the first user account as position covering. The selection operation may be pressing one or more preset physical buttons to set the currently recommended team position of the first user account as position covering. Alternatively, the selection operation may be performed by using signals generated by long pressing, tapping, double tapping, and/or sliding a designated region on a touch screen.

The covered position is a team position that is not selected by the second user accounts, that is, a team position other than the second current team positions.

Step 1103. Transmit the currently recommended team position to the server.

The client transmits the currently recommended team position to the server.

In some embodiments, when the terminal receives a selection operation performed on the position covering control, the terminal determines that the user needs to determine a covered position as the currently recommended team position.

Step 1104. Display second user accounts and a first current team position of a first user account in response to a battle matching operation.

For example, in a MOBA Game, if team positions selected by the second user accounts are a mid laner, a top laner, a jangler, and a support, only a team position of an archer is not selected, so that the server sets the archer as the currently recommended team position of the user account.

In some embodiments, after receiving a battle matching operation, the server allocates second user accounts for the first user account in the current battle, further determines a covered position based on second current team positions corresponding to the second user accounts, determines the covered position as the first current team position, and further feeds the second user accounts and the first current team position back to the terminal, so that the terminal may display the first current team position and the second user accounts.

Step 1105. Display a team position notification interface.

For the implementation of this step, reference may be made to step 505, and details are not described again in this embodiment.

Step 1106. Highlight the candidate virtual characters corresponding to the first current team position in the virtual character selection interface.

For the implementation of this step, reference may be made to step 506, and details are not described again in this embodiment.

Step 1107. Only display the candidate virtual characters corresponding to the first current team position in the virtual character selection interface.

For the implementation of this step, reference may be made to step 507, and details are not described again in this embodiment.

Step 1108. Display the candidate virtual characters corresponding to the first current team position at first k positions of candidate virtual characters in the virtual character selection interface.

For the implementation of this step, reference may be made to step 508, and details are not described again in this embodiment.

Step 1106, step 1107, and step 1108 are a combined scheme or at least one combination.

Step 1109. Determine, in response to a selection operation performed on a target virtual character in the plurality of candidate virtual characters, the target virtual character as a master character of the first user account in the current battle.

For the implementation of this step, reference may be made to step 509, and details are not described again in this embodiment.

In conclusion, in this embodiment, before a battle officially begins, a server determines a current team position for a first user account, so that when a user begins to select a specific target virtual character, a current team position to be used is already determined, which can not only avoid coordination and selection of team positions after team matching, but also can simplify the process of team matching, thereby improving the efficiency of team matching.

Requirements of different users are fully met, so that a user may help the team win the game according to a battle capability of the user, which may reduce the battle pressure of other users.

When the first current team position is determined by the server according to a historical battle record of the first user account, a process of team matching may be simplified, thereby improving the efficiency of team matching. To specify the relationship between the historical battle record and the current team position, an exemplary embodiment is used for description below.

Figure 12:
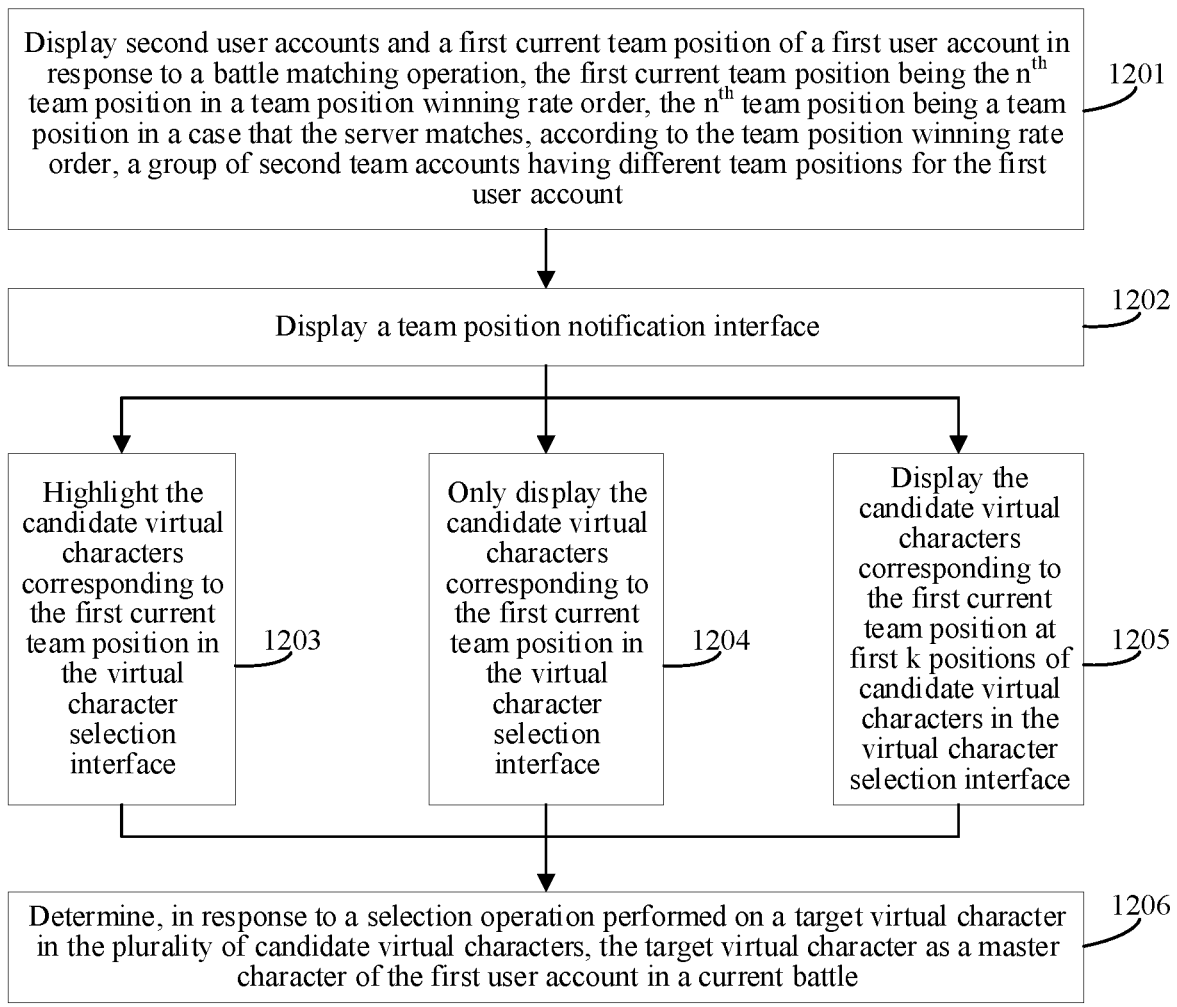
FIG. 12 is a schematic flowchart of a virtual character selection method according to another exemplary embodiment of this application.

FIG. 12 is a schematic flowchart of a virtual character selection method according to an exemplary embodiment of this application. The method may be performed by the terminal 110 or the terminal 130 shown in FIG. 1. The method includes the following steps:

Step 1201. Display second user accounts and a first current team position of a first user account in response to a battle matching operation, the first current team position being the $n^{th}$ team position in a team position winning rate order, the $n^{th}$ team position being a team position when the server matches, according to the team position winning rate order, a group of second team accounts having different team positions for the first user account.

The team position winning rate order is an order obtained by sorting team positions according to winning rates of the historical battle record of the first user account.

The $n^{th}$ team position is a team position when the server matches, according to the team position winning rate order, a group of second team accounts having different team positions for the first user account. In some embodiments, the team position winning rate order is obtained according to a descending order of winning rates corresponding to the team positions, or an ascending order of winning rates corresponding to the team positions.

In some embodiments, when the server performs matching for the first user account according to the $n^{th}$ team position in the team position winning rate order, whether the server can successfully match a group of second team accounts having different team positions for the first user account is determined. If the server successfully matches the group of second team accounts, the server sets the $n^{th}$ team position in the team position winning rate order as the current team position. If the server fails to match the group of second team accounts, the server performs matching for the first user account according to the $(n+1)^{th}$ team position in the team position winning rate order.

In some embodiments, after receiving a battle matching operation, the terminal transmits a battle matching instruction to the server. After receiving the battle matching instruction, the server obtains a team position winning rate order in a historical battle record corresponding to the first user account, first performs battle matching based on the team position in the team position winning rate order, determines, if a group of second team accounts is matched, the first team position as the first current team position, and further feeds a matching result to the terminal, so that the terminal may display the first current team position and second user accounts based on the matching result. If a group of second team accounts is not matched, the server continues to perform battle matching based on the second team position in the team position winning rate order, until a group of second team accounts is successfully matched.

Step 1202. Display a team position notification interface.

For the implementation of this step, reference may be made to step 505, and details are not described again in this embodiment.

Step 1203. Highlight the candidate virtual characters corresponding to the first current team position in the virtual character selection interface.

For the implementation of this step, reference may be made to step 506, and details are not described again in this embodiment.

Step 1204. Only display the candidate virtual characters corresponding to the first current team position in the virtual character selection interface.

For the implementation of this step, reference may be made to step 507, and details are not described again in this embodiment.

Step 1205. Display the candidate virtual characters corresponding to the first current team position at first k positions of candidate virtual characters in the virtual character selection interface.

For the implementation of this step, reference may be made to step 508, and details are not described again in this embodiment.

Step 1203, step 1204, and step 1205 are a combined scheme or at least one combination.

Step 1206. Determine, in response to a selection operation performed on a target virtual character in the plurality of candidate virtual characters, the target virtual character as a master character of the first user account in the current battle.

For the implementation of this step, reference may be made to step 509, and details are not described again in this embodiment.

In conclusion, in this embodiment, before a battle officially begins, a server determines a current team position for a first user account, so that when a user begins to select a specific target virtual character, a current team position to be used is already determined, which can not only avoid coordination and selection of team positions after team matching, but also can simplify the process of team matching, thereby improving the efficiency of team matching.

In addition, a team position is allocated for the first user account according to a historical battle record of the first user account, which can improve a battle winning rate of the user, thereby improving the battle experience of players, and reducing conflicts between the users. It also helps the user decide to use a character of which team position in the battle, so that the issue that the user cannot obtain a desired team position is resolved, and it is ensured that the user can obtain a desired team position, thereby improving the game experience of players. In addition, a situation in which players need to grab team positions in the game may be reduced, thereby reducing conflicts between the players, and purifying the game environment.

Figure 13:
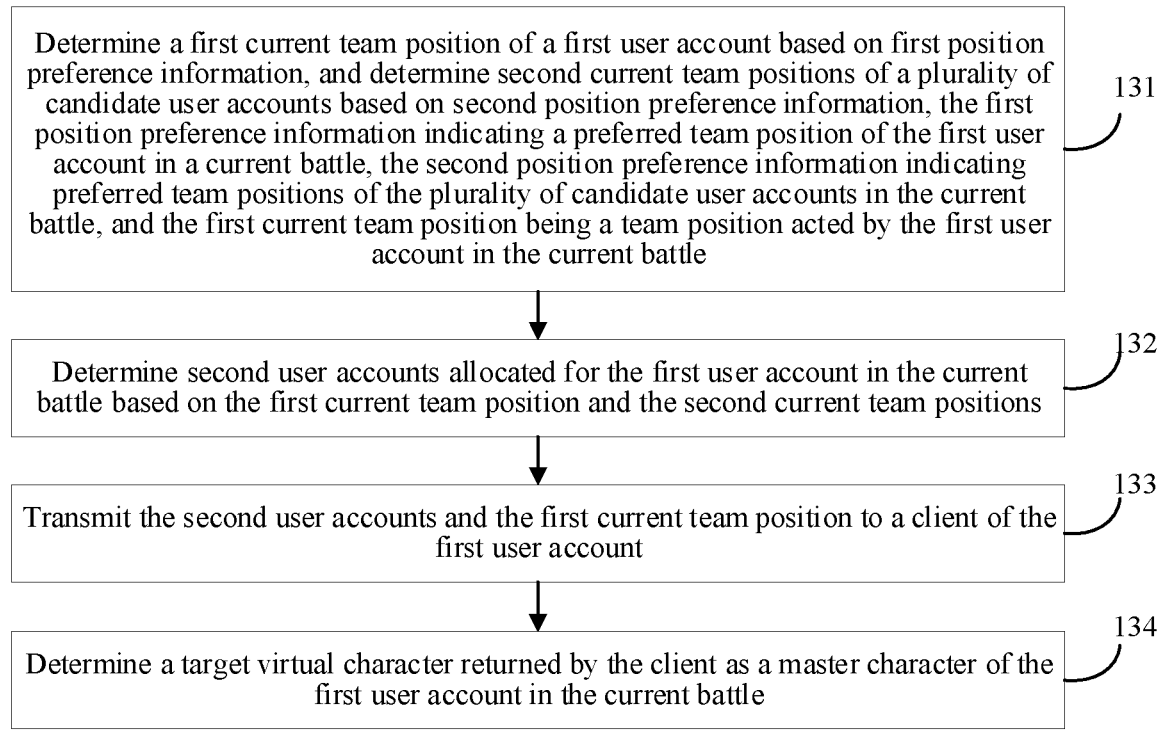
FIG. 13 is a flowchart of a virtual character selection method according to another exemplary embodiment of this application.

FIG. 13 is a schematic flowchart of a virtual character selection method according to an exemplary embodiment of this application. The method may be performed by the server 120 shown in FIG. 1. The method includes the following steps:

Step 131. Determine a first current team position of a first user account based on first position preference information, and determine second current team positions of a plurality of candidate user accounts based on second position preference information, the first position preference information indicating a preferred team position of the first user account in a current battle, the second position preference information indicating preferred team positions of the plurality of candidate user accounts in the current battle, and the first current team position being a team position acted by the first user account in the current battle.

The first position preference information indicates the preferred team position of the first user account in the current battle.

In some embodiments, the first position preference information in this embodiment includes at least the following three cases:
1. The first position preference information includes a preference priority of a plurality of team positions set by the first user account.
2. The first position preference information includes a currently recommended team position of the first user account.
3. The first position preference information includes position covering information of the first user account.

For example, in a MOBA game, if a user prefers to being a top laner, first position preference information set by the user indicates that the user prefers to being a top laner.

The first current team position is a team position allocated by the server for the user account in the current battle.

In some embodiments, team positions are classified according to responsibilities took by virtual characters in the team. For example, in a 5V5 battle of the MOBA game, the team positions may include at least one of a top laner, a mid laner, a jungler, an archer, and a support.

Step 132. Determine second user accounts allocated for the first user account in the current battle based on the first current team position and the second current team positions.

The second user accounts are user accounts in a same team as the first user account. In some embodiments, the second user accounts and the first user account are friends, or the second user accounts and the first user account are strangers.

In some embodiments, the current battle includes at least two teams. The teams may have a hostile relationship or a cooperation relationship with each other. Alternatively, the teams may have no direct relationship. For example, the battle includes a team 1, a team 2, and a team 3. The team 1 and the team 2 have a cooperation relationship with each other, the team 1 and the team 3 have a hostile relationship with each other, but the team 2 and the team 3 have no direct relationship.

In some embodiments, the second user accounts may be matched based on the first current team position. Alternatively, the second user accounts may be determined by using the first current team position of the first user account and a battle point of the first user account.

For example, if a battle point of the first user account is 1500, and the first current team position is a "mid laner", user accounts having a battle point of 1500 are respectively matched from a "top laner" matching sub-pool, a "jungler" matching sub-pool, a "support" matching sub-pool, and an "archer" matching sub-pool.

Step 133. Transmit the second user accounts and the first current team position to a client of the first user account.

In some embodiments, after determining the second user accounts allocated for the first user account and the first current team position, the server may feed the first current team position and the second user accounts back to a client corresponding to the first user account. After the client corresponding to the first user account receives the second user accounts and the first current team position of the first user account, the second user accounts and the first current team position of the first user account are displayed on the terminal. In some embodiments, at least one of names, avatars, ages, native places, and identity serial numbers of the second user accounts, and the first current team position are displayed on the terminal.

In some embodiments, the server further feeds the first current team position and the first user account to clients corresponding to the second user accounts, so that the second user accounts may know the matching result.

In some embodiments, after determining the first current team position, the terminal may display candidate virtual characters in a virtual character selection interface based on the first current team position.

Step 134. Determine a target virtual character returned by the client as a master character of the first user account in the current battle.

The target virtual character is a master character of the first user account in the current battle.

In some embodiments, after receiving a selection operation performed on a target virtual character in the candidate virtual characters, the terminal determines the target virtual character, and transmits the target virtual character to the server. The corresponding server may feed a result that the first user account selects the target virtual character back to clients of the second user accounts.

In conclusion, in this embodiment, before a battle officially begins, a server determines a current team position for a first user account, which can simplify the process of team matching of users, thereby improving the efficiency of team matching. In addition, the matching process is relatively simple, and excessive interactions between clients are not needed, which can reduce the execution pressure of the server, and can also reduce conflicts between users, thereby improving the matching efficiency.

Figure 14:
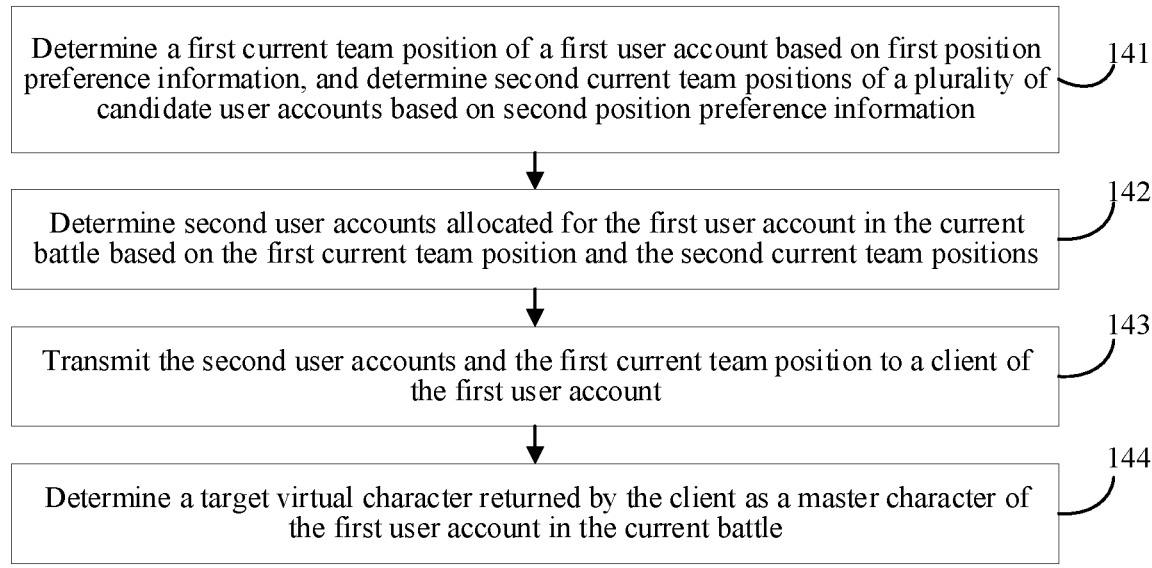
FIG. 14 is a flowchart of a virtual character selection method according to another exemplary embodiment of this application.

FIG. 14 is a schematic flowchart of a virtual character selection method according to an exemplary embodiment of this application. The method may be performed by the server 120 shown in FIG. 1. The method includes the following steps:

Step 141. Determine a first current team position of a first user account based on first position preference information, and determine second current team positions of a plurality of candidate user accounts based on second position preference information.

The first current team position is a preferred team position of the first user account.

The second current team positions are preferred team positions of user accounts other than the first user account.

Step 142. Determine second user accounts allocated for the first user account in the current battle based on the first current team position and the second current team positions.

The second user accounts are user accounts in a same team as the first user account. In some embodiments, the second user accounts and the first user account are friends, or the second user accounts and the first user account are strangers.

In some embodiments, the battle includes at least two teams. The teams may have a hostile relationship or a cooperation relationship with each other. Alternatively, the teams may have no direct relationship. For example, the battle includes a team 1, a team 2, and a team 3. The team 1 and the team 2 have a cooperation relationship with each other, the team 1 and the team 3 have a hostile relationship with each other, but the team 2 and the team 3 have no direct relationship.

The second user accounts are determined by using the first current team position of the first user account and a battle point of the first user account.

In some embodiments, the step includes the following sub-steps:

1. Narrow a matching pool according to the first current team position of the first user account.

In some embodiments, the server divides the matching pool into a plurality of matching sub-pool according to team positions, first current team positions of user accounts in a same matching sub-pool are same. A matching sub-pool other than a matching sub-pool corresponding to the first current team position is determined as a narrowed matching pool. To be specific, a matching sub-pool corresponding to team positions that are different from the first current team position is determined as a narrowed matching pool, so that second user accounts are allocated for the first user account from the narrowed matching pool.

For example, in a MOBA game, the server divides the matching pool into five matching sub-pools according to team positions, which are respectively a "mid laner" matching sub-pool, a "top laner" matching sub-pool, a "jungler" matching sub-pool, a "support" matching sub-pool, and an "archer" matching sub-pool. When a current team position of a user account is a "mid laner", the matching pool used for matching is narrowed to a "top laner" matching sub-pool, a "jungler" matching sub-pool, a "support" matching sub-pool, and an "archer" matching sub-pool.

2. Determine second user accounts corresponding to the first user account in the current battle from the narrowed matching pool based on the first current team position and the second current team positions.

In some embodiments, second user accounts corresponding to the first user account in the current battle are determined from the narrowed matching pool according to the first current team position of the first user account, a battle point of the first user account, and the second current team positions.

For example, if a battle point of the first user account is 1500, and the current team position is a "mid laner", user accounts having a battle point of 1500 are respectively matched from a "top laner" matching sub-pool, a "jungler" matching sub-pool, a "support" matching sub-pool, and an "archer" matching sub-pool.

Step 143. Transmit the second user accounts and the first current team position to a client of the first user account.

In some embodiments, after the client of the first user account receives the second user accounts and the current team position of the first user account, the second user accounts and the current team position of the first user account are displayed on the terminal. In some embodiments, at least one of names, avatars, ages, native places, and identity serial numbers of the second user accounts, and the current team position are displayed on the terminal.

Step 144. Determine a target virtual character returned by the client as a master character of the first user account in the current battle.

The target virtual character is a master character of the first user account in the current battle.

In conclusion, in this embodiment, before a battle officially begins, a server determines a current team position for a first user account, which can simplify the process of team matching of users, thereby improving the efficiency of team matching. In addition, the matching process is relatively simple, and excessive interactions between clients are not needed, which can reduce the execution pressure of the server, and can also reduce conflicts between users, thereby improving the matching efficiency.

Figure 15:
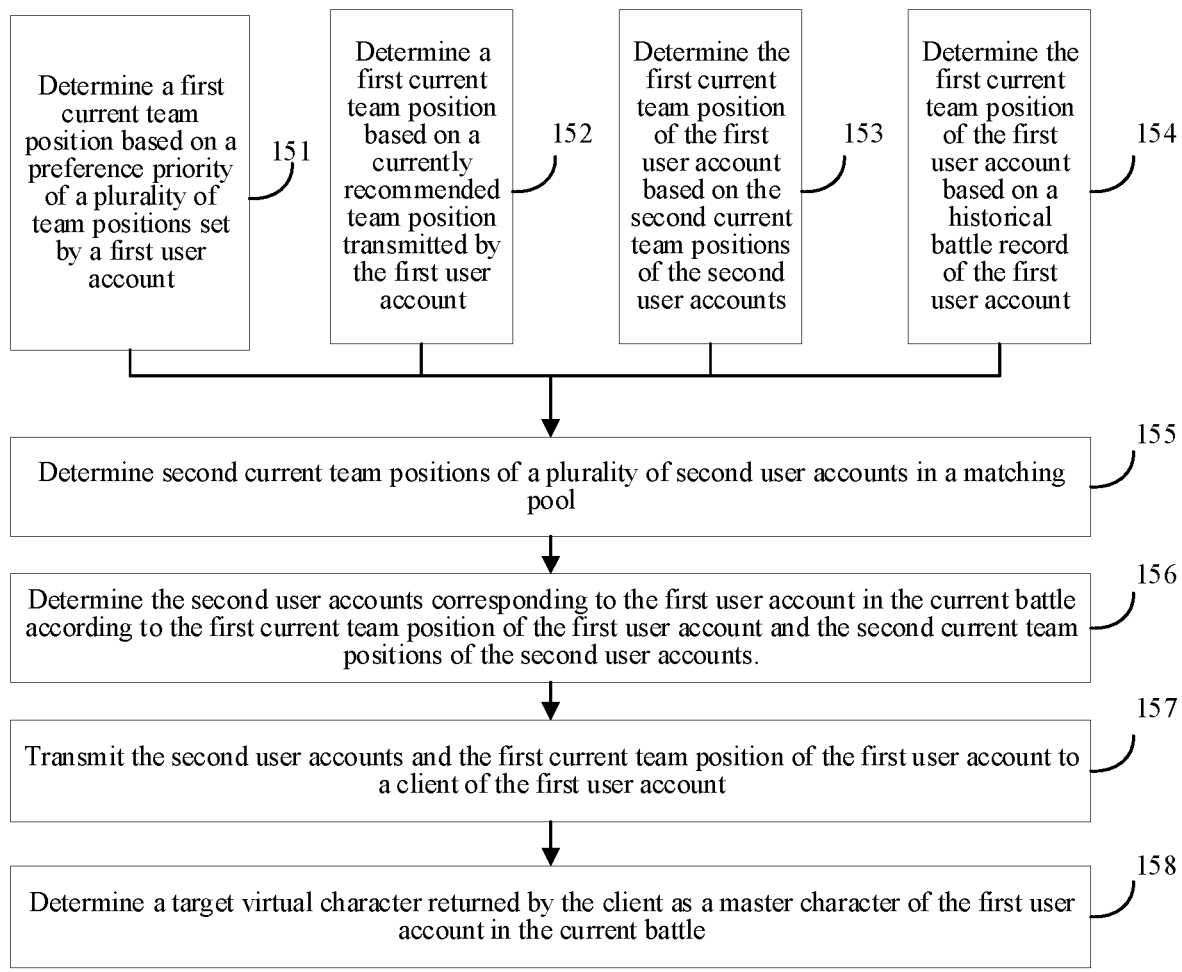
FIG. 15 is a schematic flowchart of a virtual character selection method according to another exemplary embodiment of this application.

FIG. 15 is a schematic flowchart of a virtual character selection method according to an exemplary embodiment of this application. The method may be performed by the server 120 shown in FIG. 1. The method includes the following steps:

Step 151. Determine a first current team position based on a preference priority of a plurality of team positions set by a first user account.

In some embodiments, after receiving a preference priority of team positions that is set by a first user account and that is transmitted by a client, the server may perform battle matching based on the preference priority of the team positions, to determine a first current team position.

When a group of second team accounts having different team positions is successfully matched for the first user account according to a team position priority order, the $m^{th}$ team position that is in the team position priority order and that is transmitted by the client is determined as the first current team position of the first user account. For example, m=1.

For example, when the server performs matching for the first user account according to the 1st team position in the team position priority order, and successfully matches a group of second team accounts having different team positions for the first user account, the 1st team position is used as the first current team position.

For example, when the server performs matching for the first user account according to the $m^{th}$ team position in the team position priority order, whether the server can successfully match a group of second team accounts having different team positions for the first user account is determined. If the server can successfully match the group of second team accounts, the server uses the $m^{th}$ team position as the current team position. If the server fails to match the group of second team accounts, the server performs matching for the first user account according to the $(m+1)^{th}$ team position in the team position priority order.

The second team accounts refer to an account group formed by at least two second user accounts. For example, if a second account 1, a second account 2, and a second account 3 are matched for the first user account, the second team accounts herein refer to an account group formed by the second account 1, the second account 2, and the second account 3.

The group of second team accounts having different team positions herein refers to that there are different team positions between the first user account and the second team accounts, or there are different team positions in positions of the second team accounts. Therefore, a team to which the first user account pertains has different team positions.

Step 152. Determine the first current team position based on a currently recommended team position transmitted by the first user account.

When a group of second team accounts having different team positions is successfully matched for the first user account according to the currently recommended team position, the currently recommended team position is determined as the first current team position.

When a group of second team accounts having different team positions fails to be matched for the first user account according to the currently recommended team position, and the group of second team accounts is successfully matched for the first user account according to another team position, the another team position is determined as the first current team position, the another team position being a team position other than the currently recommended team position.

In some embodiments, when the server fails to match, according to the currently recommended team position, a group of second team accounts having different team positions for the first user account, the first current team position is obtained by the server by using a historical battle record of the user account, and the first current team position is different from the currently recommended team position.

In some embodiments, when the server fails to match, according to the currently recommended team position, a group of second team accounts having different team positions for the first user account, the first current team position is determined by the server according to second current team positions corresponding to second user accounts, a team position other than the second current team positions may be determined as the first current team position, and the first current team position is different from the currently recommended team position.

In some embodiments, when the server fails to match, according to the currently recommended team position, a group of second team accounts having different team positions for the first user account, the first current team position is obtained by the server, and the first current team position is different from the currently recommended team position.

Step 153. Determine the first current team position of the first user account based on the second current team positions of the second user accounts.

In some embodiments, after position covering is performed according to the second current team positions of the second user accounts, a team position that is not selected by the second user accounts is determined as the first current team position of the first user account.

Position covering indicates that the first user account selects a team position that is not selected by the second user accounts as the currently recommended team position.

For example, in a MOBA Game, if team positions selected by the second user accounts are a mid laner, a top laner, a jangler, and a support, only a team position of an archer is not selected, so that the server sets the archer as the current team position of the first user account.

Step 154. Determine the first current team position of the first user account based on a historical battle record of the first user account.

When a group of second team accounts having different team positions is successfully matched for the first user account according to a team position winning rate order, the $n^{th}$ team position in the team position winning rate order is determined as the first current team position of the first user account. The team position winning rate order is an order obtained by sorting team positions according to winning rates of the historical battle record of the first user account.

In some embodiments, when the server performs matching for the first user account according to the $n^{th}$ team position in the team position winning rate order, whether the server can successfully match a group of second team accounts having different team positions for the first user account is determined. If the server successfully matches the group of second team accounts, the server sets the $n^{th}$ team position in the team position winning rate order as the current team position. If the server fails to match the group of second team accounts, the server performs matching for the first user account according to the $(n+1)^{th}$ team position in the team position winning rate order.

Step 151, step 152, step 153, and step 154 are a combined scheme or at least one combination.

Step 155. Determine second current team positions of a plurality of second user accounts in a matching pool.

For current team positions of a plurality of user accounts in the matching pool, reference may be made to the foregoing step 151 to step 154, and details are not described herein again.

Step 156. Determine the second user accounts corresponding to the first user account in the current battle according to the first current team position of the first user account and the second current team positions of the plurality of second user accounts.

For the implementation of this step, reference may be made to step 142, and details are not described again in this embodiment.

Step 157. Transmit the second user accounts and the first current team position of the first user account to a client of the first user account.

For the implementation of this step, reference may be made to step 143, and details are not described again in this embodiment.

Step 158. Determine a target virtual character returned by the client as a master character of the first user account in the current battle.

For the implementation of this step, reference may be made to step 144, and details are not described again in this embodiment.

In conclusion, in this embodiment, before a battle officially begins, a server determines a current team position for a first user account, which can simplify the process of team matching of users, thereby improving the efficiency of team matching. In addition, the matching process is relatively simple, and excessive interactions between clients are not needed, which can reduce the execution pressure of the server, and can also reduce conflicts between users, thereby improving the matching efficiency.

Therefore, that the issue of a user not being able to obtain a desired team position is resolved, and it is ensured that the user can obtain a desired team position, thereby improving the game experience of players. In addition, a situation in which players need to grab team positions in the game may be reduced, thereby reducing conflicts between the players, and making the game environment a friendlier one.

In addition, a plurality of methods of obtaining the current team position are provided for the server, thereby ensuring policies of the server selecting team positions for users in various scenarios, which is practical.

In a battle, a user usually invites user accounts that are friends of the user to enter the same round of battle. In this case, the user needs to create a team room, facilitating the user in inviting friends to enter the battle. The user may determine a team position priority order in the team room, thereby facilitating the following battle.

Figure 16:
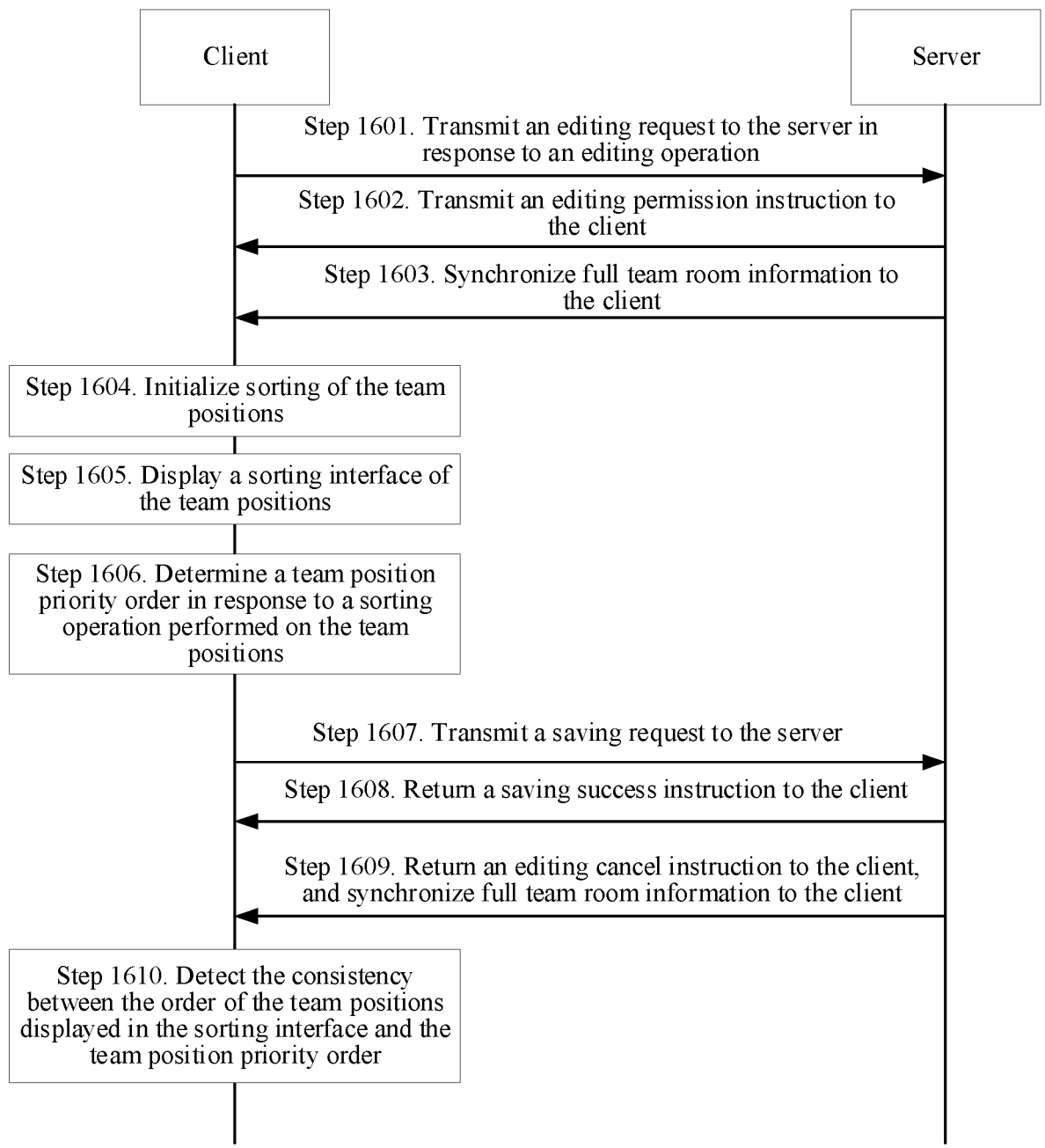
FIG. 16 is a schematic flowchart of a virtual character selection method according to an exemplary embodiment of this application.

FIG. 16 is a schematic flowchart of a virtual character selection method according to an exemplary embodiment of this application. The method may be performed by the computer system 100 shown in FIG. 1. The method includes the following steps:

Step 1601. Transmit an editing request to the server in response to an editing operation.

A client transmits an editing request to a server in response to an editing operation.

In some embodiments, an editing control is displayed in a user interface, and an editing request is transmitted to the server in response to an editing operation performed on the editing control.

The editing request is used for requesting the server to edit a team position priority order, that is, edit a preference priority of team positions.

Step 1602. Transmit an editing permission instruction to the client.

The server transmits an editing permission instruction to the client.

The editing permission instruction is used for informing the client that the team position priority order is permitted to be edited.

Step 1603. Synchronize full team room information to the client.

The server synchronizes full team room information to the client.

The full team room information refers to all information that is related to the team room and that is carried by the user accounts. In some embodiments, the full team room information includes at least one of identity numbers of the user accounts, floor information of the user accounts, flow stage information of the users in the team room, team information of players.

Step 1604. Initialize sorting of the team positions.

The client initializes sorting of the team positions.

Step 1605. Display a sorting interface of the team positions.

The client displays a sorting interface of the team positions.

Step 1606. Determine a team position priority order in response to a sorting operation performed on the team positions.

The client determines a team position priority order in response to a sorting operation performed on the team positions.

The sorting operation is used for adjusting an order of the team positions in the sorting interface. The sorting operation may be pressing one or more preset physical buttons to adjust an order of the team positions in the sorting interface. Alternatively, the sorting operation may be performed by using signals generated by long pressing, tapping, double tapping, and/or sliding a designated region on a touch screen.

Step 1607. Transmit a saving request to the server.

The client transmits a saving request to the server.

The saving request is used for requesting the server to save the team position priority order in the client, so that the team position priority order in the client is the same as that in the server.

Step 1608. Return a saving success instruction to the client.

The server returns a saving success instruction to the client.

The saving success instruction is used for inform the client that the server has saved the team position priority order.

Step 1609. Return an editing cancel instruction to the client, and synchronize full team room information to the client.

The server returns an editing cancel instruction to the client, and the server synchronizes full team room information to the client.

The editing cancel instruction is used for forbidding a sorting operation performed on the team positions in the client.

For example, each user account in the team room carries an integer array with a length of 5 to store the team position priority order. For example, in a MOBA game, the meaning included in each number is as follows:

"BATTLE_LOCATION_MID=1" represents a mid laner.

"BATTLE_LOCATION_UP=2" represents a top laner.

"BATTLE_LOCATION_DOWN=3" represents an archer.

"BATTLE_LOCATION_SUPPORT=4" represents a support.

"BATTLE_LOCATION_JUNGLE=S" represents a jungler.

"BATTLE_LOCATION_ANY=6" represents position covering.

For example, each user account in the team room carries a team status to mark a status of the user. The team status may be synchronized to all the users in the team room, to facilitate that the users know status of friend user accounts in the current battle. For example, in a MOBA game, the team status is as follows:

"TEAM_MEMBER_STATUS_NORMAL=0" represents that the user account is in the team room.

"TEAM_MEMBER_STATUS_WAITING=1" represents that the user account is entering the team room.

"TEAM_MEMBER_STATUS_FIGHTING=2" represents that the user account is fighting.

"TEAM_MEMBER_STATUS_PLACEHOLDER=3" represents that the user account is not in the team room.

"TEAM_MEMBER_STATUS_CHOOSING_LOCATION=6" represents that the user account is adjusting the team position priority order.

Step 1610. Detect the consistency between the order of the team positions displayed in the sorting interface and the team position priority order.

The client detects the consistency between the order of the team positions displayed in the sorting interface and the team position priority order.

In conclusion, in this embodiment, a method of determining a team position priority order is provided in a team room, so that users in the same battle room may know statuses of other users, to facilitate quick coordination and communication between the users, which is beneficial to quick beginning of the battle.

In addition, it is ensured that the user can obtain a desired team position, thereby improving the game experience of players. In addition, a situation in which players need to grab team positions in the game may be reduced, thereby reducing conflicts between the players, and purifying the game environment.

Figure 17:
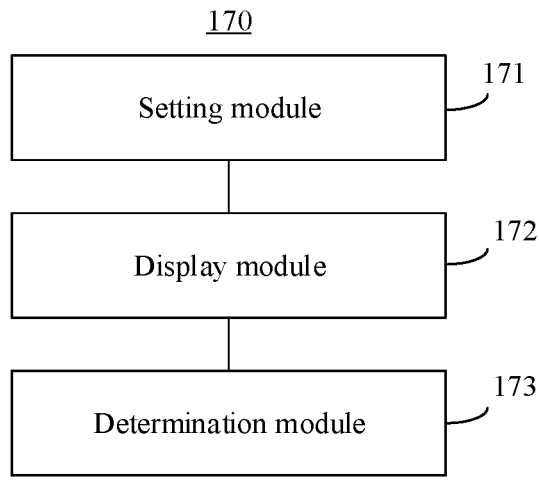
FIG. 17 is a schematic structural diagram of a virtual character selection apparatus according to an exemplary embodiment of this application.

FIG. 17 is a schematic structural diagram of a virtual character selection apparatus according to an exemplary embodiment of this application. The apparatus may be implemented as an entire computer device or a part of the computer device by using software, hardware, or a combination thereof. The apparatus 170 includes:

a setting module 171, configured to set first position preference information of a first user account in response to a preference setting operation, the first position preference information indicating a preferred team position of the first user account in a current battle;

a display module 172, configured to display a first current team position of the first user account in response to a battle matching operation, the first current team position being a team position acted by the first user account in the current battle, and the first current team position being allocated based on the first position preference information, the display module 172 being further configured to display a plurality of candidate virtual characters, the candidate virtual character being displayed based on the first current team position; and a determination module 173, configured to determine, in response to a selection operation performed on a target virtual character in the plurality of candidate virtual characters, the target virtual character as a master character of the first user account in the current battle.

In an embodiment of this application, the first position preference information includes a preference priority of a plurality of team positions set by the first user account; or the first position preference information includes a currently recommended team position of the first user account, the currently recommended team position being at least one of team positions; or the first position preference information includes position covering information of the first user account, the position covering information being used for indicating that the currently recommended team position of the first user account is determined by performing position covering according to second current team positions of second user accounts, the second user accounts being user accounts in a same team as the first user account.

In an embodiment of this application, the display module 172 is further configured to identify the recommended candidate virtual characters in a virtual character selection interface based on the first current team position.

In an embodiment of this application, the display module 172 is further configured to display second user accounts in response to the battle matching operation, the second user accounts being user accounts in a same team as the first user account, the second user accounts being allocated for the first user account in the current battle, and the second user accounts being matched based on the first position preference information.

In an embodiment of this application, the display module 172 is further configured to display second current team positions of the second user accounts, the second current team positions being allocated for the second user accounts in the current battle, and the second current team positions being allocated based on second position preference information, the second position preference information indicating preferred team positions of the second user accounts in the current battle.

In an embodiment of this application, the preference setting operation includes a sorting operation when the first position preference information includes the preference priority of the plurality of team positions set by the first user account; and the setting module 171 is further configured to display a sorting interface of the team positions; and determine the preference priority of the team positions in response to the sorting operation performed on the team positions.

In an embodiment of this application, the first current team position is the $m^{th}$ team position in the preference priority of the plurality of team positions, the $m^{th}$ team position being a team position in a case that a server matches, based on the preference priority of the team positions, a group of second team accounts having different team positions for the first user account, and m being a positive integer.

In an embodiment of this application, the preference setting operation includes a selection operation in a case that the first position preference information includes the currently recommended team position of the first user account; and In an embodiment of this application, the setting module 171 is further configured to display candidate team positions; and determine, in response to the selection operation performed on a target team position in the candidate team positions, the target team position as the currently recommended team position.

In an embodiment of this application, the first current team position is the same as the currently recommended team position when the server matches, according to the currently recommended team position, a group of second team accounts having different team positions for the first user account; and the first current team position is different from the currently recommended team position when the server fails to match, according to the currently recommended team position, a group of second team accounts having different team positions for the first user account.

In an embodiment of this application, the preference setting operation includes a selection operation when the first position preference information includes the position covering information of the first user account; and In an embodiment of this application, the setting module 171 is further configured to display candidate team positions and a position covering control, the position covering control being configured to select a team position that is not selected by the second user accounts as the currently recommended team position; and determine a covered position as the currently recommended team position in response to the selection operation performed on the position covering control.

In an embodiment of this application, the display module 172 is further configured to highlight the candidate virtual characters corresponding to the first current team position in a virtual character selection interface, the virtual character selection interface being used for displaying candidate virtual characters of the first user account in the current battle; or only display the candidate virtual characters corresponding to the first current team position in the virtual character selection interface; or display the candidate virtual characters corresponding to the first current team position at first k positions of candidate virtual characters in the virtual character selection interface, k being a positive integer.

In an embodiment of this application, the display module 172 is further configured to display a team position notification interface, the team position notification interface including the first current team position.

In an embodiment of this application, the display module 172 is further configured to display the first current team position and a recommended virtual character in the team position notification interface, the recommended virtual character pertaining to the first current team position, the recommended virtual character being obtained through a default value of the server, or being obtained through a historical record of the first user account, or being obtained through custom settings of the first user account.

In conclusion, in this embodiment, position preference information is set by a user, and a server determines a current team position for a first user account, so that when the user begins to select a specific target virtual character, a current team position that is to be used is already determined, which can not only avoid coordination and selection of team positions after team matching, but also can simplify the process of team matching, thereby improving the efficiency of team matching.

Figure 18:
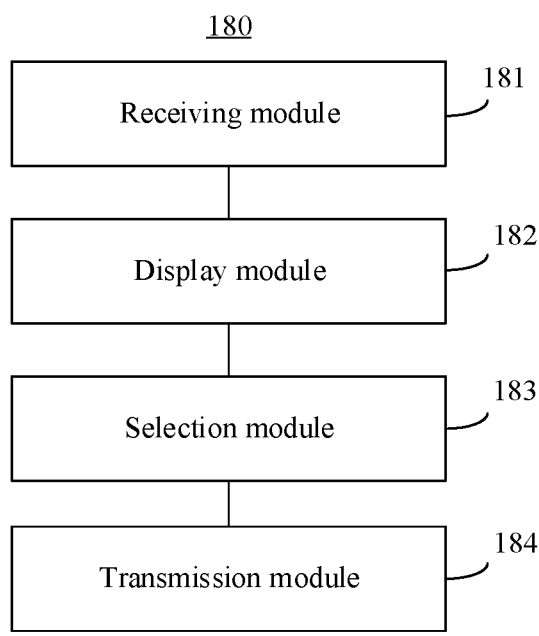
FIG. 18 is a schematic structural diagram of a virtual character selection apparatus according to an exemplary embodiment of this application.

FIG. 18 is a schematic structural diagram of a virtual character selection apparatus according to an exemplary embodiment of this application. The apparatus may be implemented as an entire computer device or a part of the computer device by using software, hardware, or a combination thereof. The apparatus 180 includes:

a receiving module 181, configured to display second user accounts and a first current team position of a first user account in response to a battle matching operation, the second user accounts being allocated for the first user account in a current battle, the second user accounts being user accounts in a same team as the first user account, and the first current team position being a team position acted by the first user account in the current battle;

a display module 182, configured to display a plurality of candidate virtual characters, the candidate virtual character being displayed based on the first current team position; and a selection module 183, configured to determine, in response to a selection operation performed on a target virtual character in the plurality of candidate virtual characters, the target virtual character as a master character of the first user account in the current battle.

In an embodiment of this application, the first current team position is determined by a server based on a preference priority of a plurality of team positions set by the first user account; or the first current team position is determined by the server based on a currently recommended team position transmitted by the first user account; or the first current team position is determined after the server performs position covering based on second current team positions of the second user accounts; or the first current team position is determined by the server based on a historical battle record of the first user account.

In an embodiment of this application, the apparatus 180 further includes: a transmission module 184.

The display module 182 is further configured to display a sorting interface of the team positions; and the transmission module 184 is configured to determine the preference priority of the plurality of team positions in response to the sorting operation performed on the team positions; and transmit the preference priority of the plurality of team positions to the server.

In an embodiment of this application, the first current team position is the $m^{th}$ team position in the preference priority of the plurality of team positions, the $m^{th}$ team position being a team position when the server matches, according to the preference priority of the plurality of team positions set by the first user account, a group of second team accounts having different team positions for the first user account.

In an embodiment of this application, in a case that the first current team position is determined by the server based on the currently recommended team position transmitted by the first user account, the display module 182 is further configured to display candidate team positions.

The transmission module 184 is further configured to determine, in response to the selection operation performed on a target team position in the candidate team positions, the target team position as the currently recommended team position; and transmit the currently recommended team position to the server.

In an embodiment of this application, the first current team position is the same as the currently recommended team position in a case that the server matches, according to the currently recommended team position, a group of second team accounts having different team positions for the first user account; and the first current team position is different from the currently recommended team position in a case that the server fails to match, according to the currently recommended team position, a group of second team accounts having different team positions for the first user account.

In an embodiment of this application, when the first current team position is determined by the server by performing position covering based on the second current team positions of the second user accounts, the display module 182 is further configured to display candidate team positions and a position covering control, the position covering control being configured to select a team position that is not selected by the second user accounts as the currently recommended team position.

The transmission module 184 is further configured to determine a covered position as the currently recommended team position in response to a selection operation performed on the position covering control; and transmit the currently recommended team position to the server.

In an embodiment of this application, when the first current team position is determined by the server based on the historical battle record of the first user account, the first current team position is the $n^{th}$ team position in a team position winning rate order, the $n^{th}$ team position being a team position when the server matches, according to the team position winning rate order, a group of second team accounts having different team positions for the first user account, n being a positive integer, and the team position winning rate order being an order obtained by sorting team positions according to winning rates of the historical battle record of the first user account.

In an embodiment of this application, the display module 182 is further configured to highlight the candidate virtual characters corresponding to the first current team position in a virtual character selection interface, the virtual character selection interface being used for displaying candidate virtual characters of the first user account in the current battle; or only display the candidate virtual characters corresponding to the first current team position in the virtual character selection interface; or display the candidate virtual characters corresponding to the first current team position at first k positions of candidate virtual characters in the virtual character selection interface.

In an embodiment of this application, the display module 182 is further configured to display a team position notification interface, the team position notification interface including the first current team position.

In an optional embodiment of this application, the display module 182 is further configured to display the first current team position and a recommended virtual character in the team position notification interface, the recommended virtual character pertaining to the first current team position, the recommended virtual character being obtained through a default value of the server, or being obtained through a historical record of the first user account, or being obtained through custom settings of the first user account.

In conclusion, in this embodiment, before a battle officially begins, a server determines a current team position for a first user account, so that when a user begins to select a specific target virtual character, a current team position to be used is already determined, which can not only avoid coordination and selection of team positions after team matching, but also can simplify the process of team matching, thereby improving the efficiency of team matching.

Figure 19:
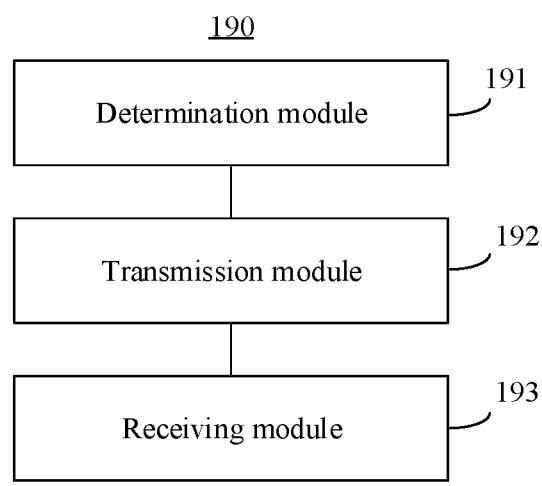
FIG. 19 is a schematic structural diagram of a virtual character selection apparatus according to an exemplary embodiment of this application.

FIG. 19 is a schematic structural diagram of a virtual character selection apparatus according to an exemplary embodiment of this application. The apparatus may be implemented as an entire computer device or a part of the computer device by using software, hardware, or a combination thereof. The apparatus 190 includes:

a determination module 191, configured to determine a first current team position of a first user account based on first position preference information, and determine second current team positions of a plurality of candidate user accounts based on second position preference information, the first position preference information indicating a preferred team position of the first user account in a current battle, the second position preference information indicating preferred team positions of the plurality of candidate user accounts in the current battle, and the first current team position being a team position acted by the first user account in the current battle, the determination module 191 being further configured to determine second user accounts allocated for the first user account in the current battle based on the first current team position and the second current team positions;

a transmission module 192, configured to transmit the second user accounts and the first current team position to a client of the first user account, the client being configured to display candidate virtual characters according to the first current team position; and a receiving module 193, configured to determine a target virtual character returned by the client as a master character of the first user account in current battle, the target virtual character being determined by performing a selection operation on the target virtual character in the plurality of candidate virtual characters.

In an embodiment of this application, the determination module 191 is further configured to determine the first current team position based on a preference priority of a plurality of team positions set by the first user account, or determine the first current team position of the first user account based on a currently recommended team position transmitted by the first user account; or determine the first current team position of the first user account based on the second current team positions of the second user accounts.

In an embodiment of this application, the determination module 191 is further configured to determine, when a group of second team accounts having different team positions is matched for the first user account according to the preference priority of the plurality of team positions set by the first user account, the $m^{th}$ team position that is in the preference priority of the plurality of team positions and that is transmitted by the client as the first current team position of the first user account.

In an embodiment of this application, the determination module 191 is further configured to determine, when a group of second team accounts having different team positions is matched for the first user account according to the currently recommended team position, the currently recommended team position as the first current team position; and determine, when a group of second team accounts having different team positions fails to be matched for the first user account according to the currently recommended team position and the group of second team accounts is successfully matched for the first user account according to another team position, the another team position as the first current team position, the another team position being a team position other than the currently recommended team position.

In an embodiment of this application, the determination module 191 is further configured to determine a team position other than the second current team positions as the first current team position of the first user account.

In an embodiment of this application, the determination module 191 is further configured to determine, when a group of second team accounts having different team positions is successfully matched for the first user account according to a team position winning rate order, the $n^{th}$ team position in the team position winning rate order as the first current team position of the first user account, the team position winning rate order being an order obtained by sorting team positions according to winning rates of the historical battle record of the first user account.

In conclusion, in this embodiment, before a battle officially begins, a server determines a current team position for a first user account, so that when a user begins to select a specific target virtual character, a current team position to be used is already determined, which can not only avoid coordination and selection of team positions after team matching, but also can simplify the process of team matching, thereby improving the efficiency of team matching.

Figure 20:
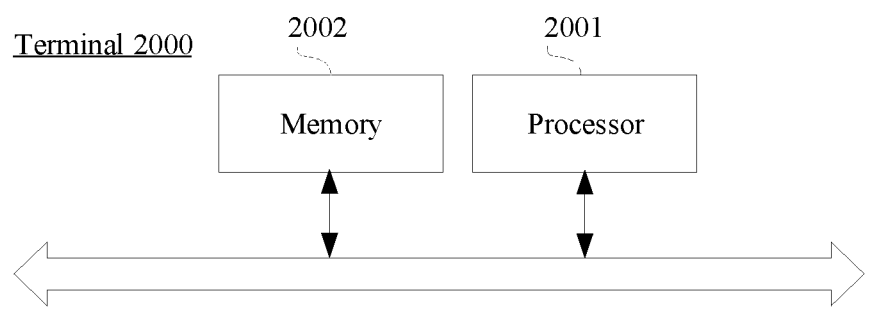
FIG. 20 is a structural block diagram of a terminal according to an exemplary embodiment of this application.

FIG. 20 is a structural block diagram of a terminal 2000 according to an exemplary embodiment of this application. The terminal 2000 may be a portable mobile terminal, such as a smart phone, a tablet computer, a Moving Picture Experts Group Audio Layer III (MP3), a Moving Picture Experts Group Audio Layer IV (MP4) player. The terminal 2000 may be further referred to as other names such as user equipment and a portable terminal.

Generally, the terminal 2000 includes a processor 2001 and a memory 2002.

The processor 2001 may include one or more processing cores, for example, a 4-core processor or an 8-core processor. The processor 2001 may be implemented by using at least one hardware form of a digital signal processor (DSP), a field-programmable gate array (FPGA), and a programmable logic array (PLA). The processor 2001 may alternatively include a main processor and a coprocessor. The main processor is configured to process data in an active state, also referred to as a central processing unit (CPU). The coprocessor is a low-power processor configured to process data in a standby state. In some embodiments, the processor 2001 may be integrated with a graphics processing unit (GPU), which is responsible for rendering and drawing a content required to be displayed by a display screen. In some embodiments, the processor 2001 may further include an artificial intelligence (AI) processor. The AI processor is configured to process a computing operation related to machine learning.

The memory 2002 may include one or more computer-readable storage media. The computer-readable storage medium may be tangible and non-transient (e.g., non-transitory). The memory 2002 may further include a high-speed random access memory and a nonvolatile memory, for example, one or more disk storage devices or flash storage devices. In some embodiments, the non-transitory computer-readable storage medium in the memory 2002 is configured to store at least one instruction, and the at least one instruction being configured to be executed by the processor 2001 to implement the method provided in the embodiments of this application.

Figure 21:
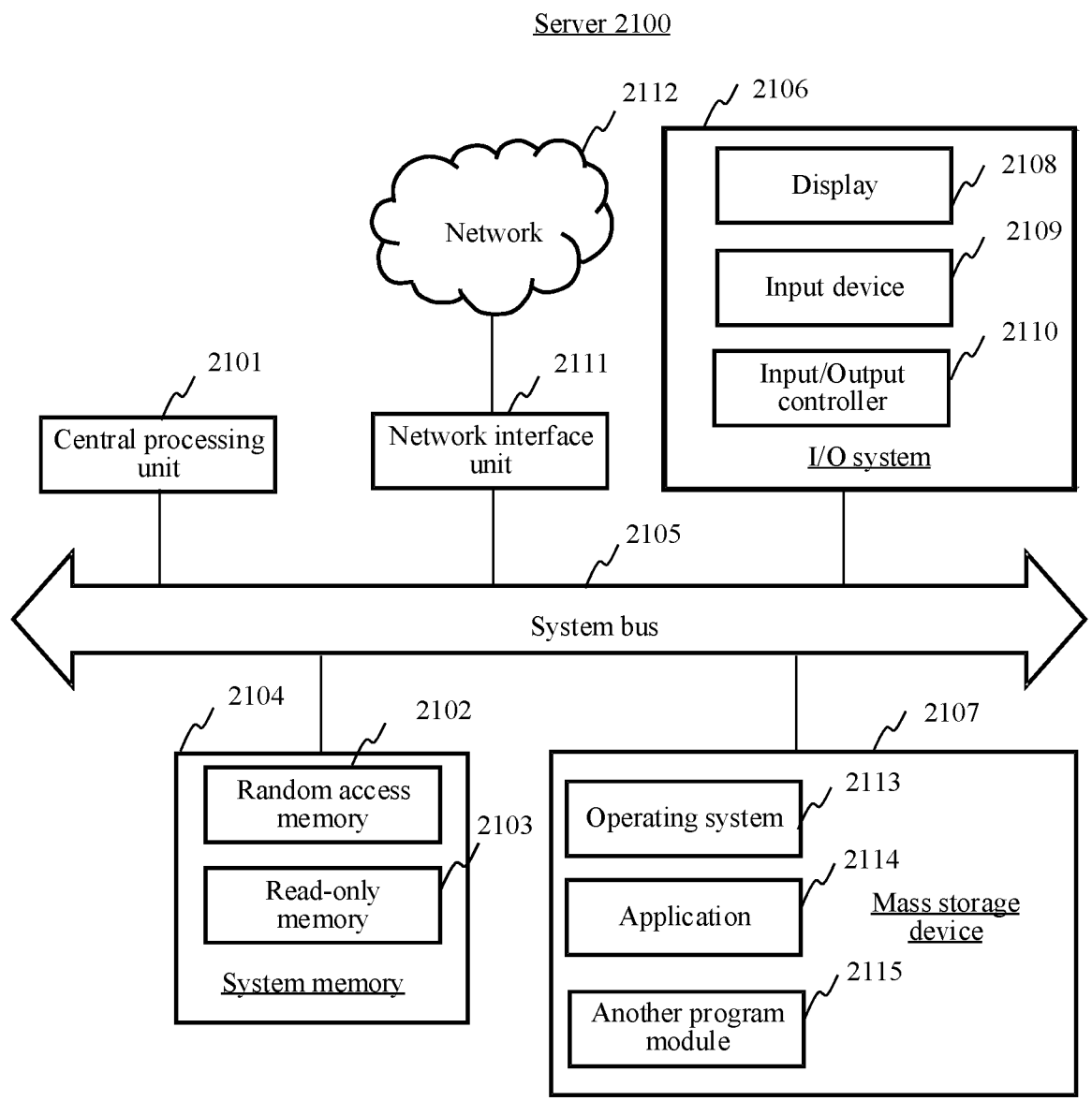
FIG. 21 is a structural block diagram of a server according to an exemplary embodiment of this application.

FIG. 21 is a schematic structural diagram of a server according to an embodiment of this application. The server may be configured to implement a team matching method performed by the server according to the foregoing embodiments. A server 2100 includes a CPU 2101, a system memory 2104 including a random access memory (RAM) 2102, and a read only memory (ROM) 2103, and a system bus 2105 connecting the system memory 2104 to the CPU 2101. The server 2100 further includes a basic input/output (I/O) system 2106 helping transmit information between components in a computer, and a mass storage device 2107 used for storing an operating system 2113, an application 2114, and another program module 2115.

The basic I/O system 2106 includes a display 2108 configured to display information and an input device 2109 configured for a user to input information, such as a mouse or a keyboard. The display 2108 and the input device 2109 are connected to an I/O controller 2110 of the system bus 2105, to be connected to the CPU 2101. The basic I/O system 2106 may further include the input/output controller 2110, to receive and process inputs from a plurality of other devices, such as the keyboard, the mouse, or an electronic stylus. Similarly, the I/O controller 2110 further provides an output to a display screen, a printer, or another type of output device.

The mass storage device 2107 is connected to the CPU 2101 by using a large-capacity storage controller (not shown) connected to the system bus 2105. The mass storage device 2107 and an associated computer-readable medium thereof provide non-volatile storage for the server 2100. That is, the mass storage device 2107 may include a computer-readable medium (not shown) such as a hard disk or a compact disc ROM (CD-ROM) drive.

In general, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may learn that the computer storage medium is not limited to the foregoing several types. The system memory 2104 and the mass storage device 2107 may be collectively referred to as a memory.

According to various embodiments of this application, the server 2100 may further be connected, by using a network such as the Internet, to a remote computer on the network and run. In other words, the server 2100 may be connected to a network 2112 through a network interface unit 2111 connected to the system bus 2105, or may be connected to other types of networks or remote computer systems (not shown) through the network interface unit 2111.

The memory further includes one or more programs. The one or more programs are stored in the memory and configured to be executed by one or more CPUs 2101.

An embodiment of this application further provides a computer-readable storage medium, storing at least one instruction, the at least one instruction being loaded and executed by a processor to implement the virtual character selection method according to the foregoing embodiments.

According to one aspect of this application, a computer program product or a computer program is provided, including computer instructions, the computer instructions being stored in a computer-readable storage medium. A processor of a terminal reads the computer instructions from the computer-readable storage medium, and executes the computer instructions, so that the terminal performs the virtual character selection method provided in the foregoing implementations.

A person skilled in the art is to be aware that in the foregoing one or more examples, functions described in the embodiments of this application may be implemented by hardware, software, firmware, or any combination thereof. When implemented by using software, the functions can be stored in a computer-readable storage medium or can be used as one or more instructions or code in a computer-readable storage medium for transmission. The computer-readable storage medium includes a computer storage medium and a communication medium, where the communication medium includes any medium that enables a computer program to be transmitted from one place to another. The storage medium may be any available medium accessible to a general-purpose or dedicated computer.

The foregoing descriptions are merely exemplary embodiments of this application, but are not intended to limit this application. Any modification, equivalent replacement, or improvement made within the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs target team position determination and/or team position notification display. In practical application, the foregoing functions may be allocated to and completed by different functional modules according to requirements, that is, an inner structure of a device is divided into different functional modules to implement all or a part of the functions described above.

What is claimed is:

1. A virtual character selection method applied to a terminal device associated with a user having a first user account, the method comprising:
   displaying a plurality of icons on a user interface of the terminal device, each icon of the plurality of icons corresponding to a respective team position of a plurality of team positions for a current online game;
   receiving, via the user interface, a preference setting operation, the preference setting operation including a user action rearranging at least two icons of the plurality of icons that are displayed on the user interface, the rearranging indicating a team position priority order of the plurality of team positions for the first user account;
   in response to receiving the preference setting operation, setting first position preference information of the first user account, the first position preference information indicating a preferred team position of the first user account in the current online game;
   in response to receiving a game matching operation:
      displaying a first current team position corresponding to the first user account, the first current team position is a position played by the first user account in the current online game, and the first current team position is assigned based on the first position preference information;
      displaying a plurality of candidate virtual characters based on the first current team position; and
      in response to receiving a selection operation performed on a target virtual character in the plurality of candidate virtual characters, designating the target virtual character as a master character of the first user account in the current online game.

2. The method according to claim 1, wherein the first position preference information is one of:
   a preference priority of a plurality of team positions set by the first user account; or
   a currently recommended team position of the first user account, the currently recommended team position being at least one of team positions; or
   position covering information of the first user account, the position covering information being used for indicating that the currently recommended team position of the first user account is determined by performing position covering according to second current team positions of second user accounts, the second user accounts being user accounts in a same team as the first user account.

3. The method according to claim 2, wherein:
   the first position preference information is the preference priority of the plurality of team positions set by the first user account;

the preference setting operation comprises a sorting operation; and setting the first position preference information of the first user account comprises:

displaying a sorting interface of the team positions; and determining the preference priority of the team positions in response to the sorting operation performed on the team positions.

4. The method according to claim 3, wherein the first current team position corresponds to a $m^{th}$ team position in the preference priority of the plurality of team positions, the $m^{th}$ team position being a team position when a server matches, based on the preference priority of the team positions, a group of second team accounts having different team positions for the first user account, and m is a positive integer.

5. The method according to claim 2, wherein:

the first position preference information is the currently recommended team position of the first user account;

the preference setting operation comprises a selection operation; and setting the first position preference information of the first user account comprises:

displaying candidate team positions; and determining, in response to the selection operation performed on a target team position in the candidate team positions, the target team position as the currently recommended team position.

6. The method according to claim 5, wherein:

the first current team position is the same as the currently recommended team position when a server matches, according to the currently recommended team position, a group of second team accounts having different team positions for the first user account; and the first current team position is different from the currently recommended team position when the server fails to match, according to the currently recommended team position, a group of second team accounts having different team positions for the first user account.

7. The method according to claim 2, wherein:

the first position preference information is the position covering information of the first user account;

the preference setting operation comprises a selection operation; and setting the first position preference information of the first user account comprises:

displaying candidate team positions and a position covering control, the position covering control being configured to select a team position that is not selected by the second user accounts as the currently recommended team position; and determining a covered position as the currently recommended team position in response to the selection operation performed on the position covering control.

8. The method according to claim 1, further comprising:

prior to displaying the plurality of candidate virtual characters, identifying the recommended candidate virtual characters in a virtual character selection interface based on the first current team position.

9. The method according to claim 1, further comprising:

displaying second user accounts in response to the game matching operation, the second user accounts comprising user accounts that belong to a same team as the first user account, the second user accounts being allocated for the first user account in the current online game, and the second user accounts are matched to the first user account based on the first position preference information.

10. The method according to claim 9, further comprising:

displaying second current team positions corresponding to the second user accounts, the second current team positions being allocated for the second user accounts in the current battle, and the second current team positions being allocated based on second position preference information, the second position preference information indicating preferred team positions of the second user accounts in the current battle.

11. The method according to claim 1, wherein displaying the plurality of candidate virtual characters comprises one of:

highlighting the candidate virtual characters corresponding to the first current team position in the virtual character selection interface, the virtual character selection interface being used for displaying candidate virtual characters of the first user account in the current battle;

only displaying the candidate virtual characters corresponding to the first current team position in the virtual character selection interface; or displaying the candidate virtual characters corresponding to the first current team position at first k positions of candidate virtual characters in the virtual character selection interface, k being a positive integer.

12. The method according to claim 1, further comprising:

before displaying the plurality of candidate virtual characters, displaying a team position notification interface, the team position notification interface comprising the first current team position.

13. The method according to claim 12, wherein displaying the team position notification interface comprises:

displaying the first current team position and a recommended virtual character in the team position notification interface, the recommended virtual character pertaining to the first current team position, the recommended virtual character being obtained through a default value of the server, a historical record of the first user account, or custom settings of the first user account.

14. An electronic device associated with a user having a first user account, the electronic device comprising:

a display;

one or more processors; and memory storing one or more programs, the one or more programs comprising instructions that, when executed by the one or more processors, cause the one or more processors to perform operations comprising:

displaying a plurality of icons on a user interface of the terminal device, each icon of the plurality of icons corresponding to a respective team position of a plurality of team positions for a current online game;

receiving, via the user interface, a preference setting operation, the preference setting operation including a user action rearranging at least two icons of the plurality of icons that are displayed on the user interface, the rearranging indicating a team position priority order of the plurality of team positions for the first user account;

in response to receiving the preference setting operation, setting first position preference information of the first user account, the first position preference information indicating a preferred team position of the first user account in the current online game;

in response to receiving a game matching operation:
  displaying a first current team position corresponding to the first user account, the first current team position is a position played by the first user account in the current online game, and the first current team position is assigned based on the first position preference information;
  displaying a plurality of candidate virtual characters based on the first current team position; and
  in response to receiving a selection operation performed on a target virtual character in the plurality of candidate virtual characters, designating the target virtual character as a master character of the first user account in the current online game.

15. The electronic device according to claim 14, wherein the operations further comprise:
  prior to displaying the plurality of candidate virtual characters, identifying the recommended candidate virtual characters in a virtual character selection interface based on the first current team position.

16. The electronic device according to claim 14, wherein the operations further comprise:
  displaying second user accounts in response to the game matching operation, the second user accounts comprising user accounts that belong to a same team as the first user account, the second user accounts being allocated for the first user account in the current online game, and the second user accounts are matched to the first user account based on the first position preference information.

17. The electronic device according to claim 16, wherein the operations further comprise:
  displaying second current team positions corresponding to the second user accounts, the second current team positions being allocated for the second user accounts in the current battle, and the second current team positions being allocated based on second position preference information, the second position preference information indicating preferred team positions of the second user accounts in the current battle.

18. A non-transitory computer-readable storage medium, storing a computer program, the computer program, when executed by one or more processors of an electronic device associated with a user having a first user account, cause the electronic device to perform operations comprising:
  displaying a plurality of icons on a user interface of the terminal device, each icon of the plurality of icons corresponding to a respective team position of a plurality of team positions for a current online game;
  receiving, via the user interface, a preference setting operation, the preference setting operation including a user action rearranging at least two icons of the plurality of icons that are displayed on the user interface, the rearranging indicating a team position priority order of the plurality of team positions for the first user account;
  in response to receiving the preference setting operation, setting first position preference information of the first user account, the first position preference information indicating a preferred team position of the first user account in the current online game;
  in response to receiving a game matching operation:
    displaying a first current team position corresponding to the first user account, the first current team position is a position played by the first user account in the current online game, and the first current team position is assigned based on the first position preference information;
    displaying a plurality of candidate virtual characters based on the first current team position; and
    in response to receiving a selection operation performed on a target virtual character in the plurality of candidate virtual characters, designating the target virtual character as a master character of the first user account in the current online game.

19. The non-transitory computer-readable storage medium according to claim 18, the operations further comprising, before displaying the plurality of candidate virtual characters:
  displaying a team position notification interface, the team position notification interface comprising the first current team position.

20. The non-transitory computer-readable storage medium according to claim 19, wherein displaying the team position notification interface comprises:
  displaying the first current team position and a recommended virtual character in the team position notification interface, the recommended virtual character pertaining to the first current team position,
  the recommended virtual character being obtained through a default value of the server, a historical record of the first user account, or custom settings of the first user account.

* * * * *